United States Patent
Nakazumi

(10) Patent No.: US 10,310,766 B2
(45) Date of Patent: Jun. 4, 2019

(54) MEMORY SYSTEM AND DATA RELOCATING METHOD

(71) Applicant: Toshiba Memory Corporation, Tokyo (JP)

(72) Inventor: Shinichiro Nakazumi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/911,015

(22) Filed: Mar. 2, 2018

(65) Prior Publication Data

US 2018/0275911 A1     Sep. 27, 2018

(30) Foreign Application Priority Data

Mar. 23, 2017    (JP) ................. 2017-058267

(51) Int. Cl.
G06F 3/06    (2006.01)

(52) U.S. Cl.
CPC .......... *G06F 3/0647* (2013.01); *G06F 3/0619* (2013.01); *G06F 3/0679* (2013.01)

(58) Field of Classification Search
CPC ..... G06F 3/0619; G06F 3/0647; G06F 3/0679
See application file for complete search history.

(56) References Cited

U.S. PATENT DOCUMENTS

| | | | |
|---|---|---|---|
| 8,135,902 B2 | 3/2012 | Kurashige | |
| 8,677,054 B1 | 3/2014 | Meir et al. | |
| 8,914,600 B2 | 12/2014 | Rubowitz | |
| 8,924,636 B2 | 12/2014 | Hirao et al. | |
| 2006/0161728 A1* | 7/2006 | Bennett | G06F 12/0246 711/103 |
| 2012/0198128 A1* | 8/2012 | Van Aken | G06F 12/0246 711/103 |
| 2014/0181370 A1* | 6/2014 | Cohen | G06F 12/0246 711/103 |

FOREIGN PATENT DOCUMENTS

| | | |
|---|---|---|
| JP | 2010-152516 A | 7/2010 |
| JP | 2013-200741 A | 10/2013 |

* cited by examiner

*Primary Examiner* — Aracelis Ruiz

(74) *Attorney, Agent, or Firm* — Kim & Stewart LLP

(57) ABSTRACT

A memory system includes a nonvolatile semiconductor memory and a memory controller circuit. The memory controller circuit selects first and second blocks of the nonvolatile semiconductor memory, the first block being a garbage collection target block, the second block being a wear leveling target block or a refresh target block, relocates first data which is valid data stored in the first block in a series of write operations to a third block including first and second write operations, the third block being a block of the nonvolatile semiconductor memory having a free region, and relocates second data which is valid data stored in the second block in a series of write operations to a fourth block including a third write operation, the fourth block having a free region and being different from the third block, wherein the third write operation is performed between the first and second write operations.

21 Claims, 19 Drawing Sheets

MEMORY SYSTEM AND DATA RELOCATING METHOD

CROSS-REFERENCE TO RELATED APPLICATION

This application is based upon and claims the benefit of priority from Japanese Patent Application No. 2017-058267, filed Mar. 23, 2017, the entire contents of which are incorporated herein by reference.

FIELD

Embodiments described herein relate generally to a memory system and a data relocating method.

BACKGROUND

In the related art, there are known memory systems called solid state drives (SSDs). SSDs are devices in which nonvolatile semiconductor memories such as NAND flash memory are used.

In NAND flash memory, data may not be overwritten. Before writing to the same location in NAND flash memory, the location needs to be first erased. The NAND flash memory executes erasing in units of blocks. Therefore, in SSDs, blocks having free regions are generated by executing a relocating process called garbage collection. Sometimes, garbage collection is executed when data is transmitted from a host to be written in the NAND flash memory. As a result, garbage collection degrades write performance of a memory system.

DETAILED DESCRIPTION

In general, according to one embodiment, a memory system includes a nonvolatile semiconductor memory including a plurality of blocks and a memory controller circuit. The memory controller circuit selects a first block and a second block from the plurality of blocks, the first block being a garbage collection target block, the second block being a wear leveling target block or a refresh target block, relocates first data which is valid data stored in the first block in a series of write operations to a third block including a first write operation and a second write operation, the third block being a block having a free region among the plurality of blocks, and relocates second data which is valid data stored in the second block in a series of write operations to a fourth block including a third write operation, the fourth block having a free region and being a different block from the third block among the plurality of blocks, wherein the third write operation is performed between the first operation and the second write operation.

Hereinafter, a memory system according to embodiments will be described in detail with reference to the following appended drawings. Exemplary embodiments are not limited to such embodiments.

First Embodiment

Figure 1:
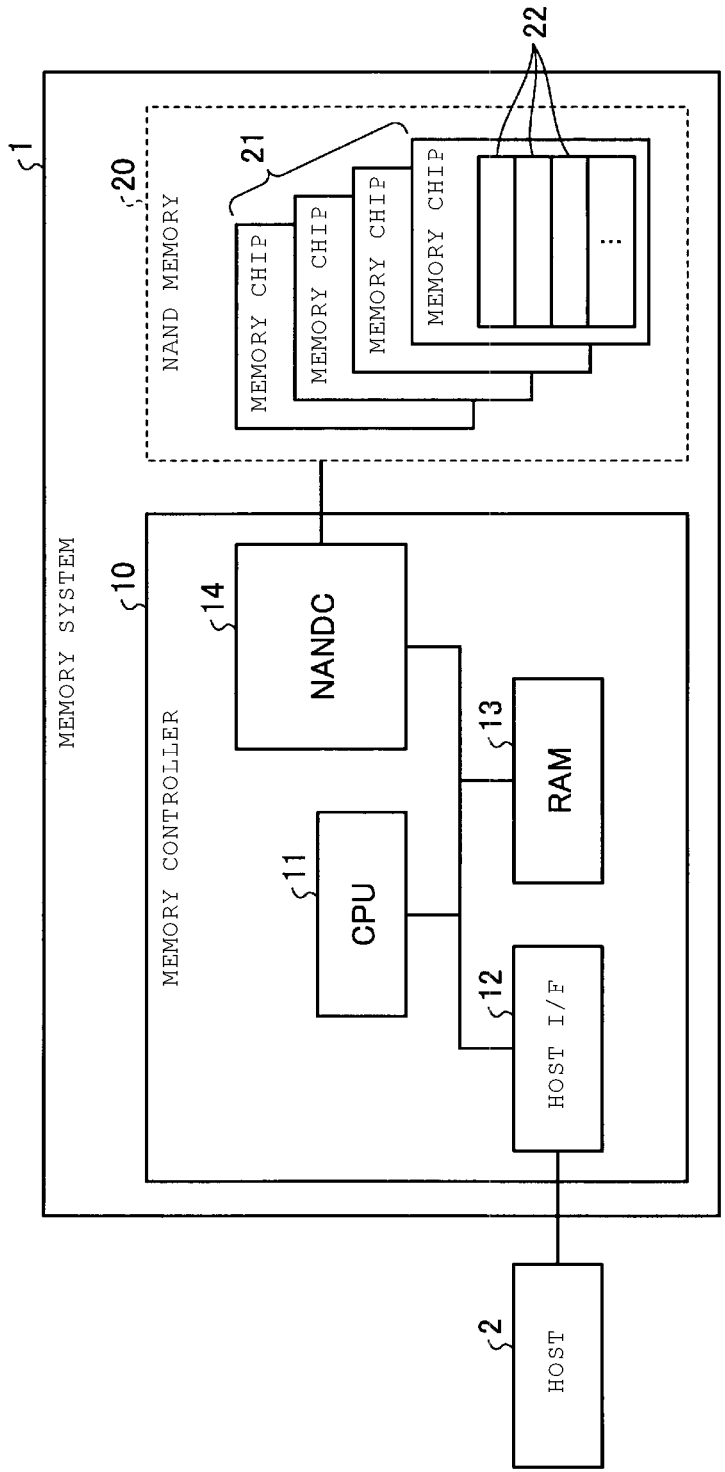
FIG. 1 is a diagram illustrating a configuration example of a memory system according to a first embodiment.

FIG. 1 is a diagram illustrating a configuration example of a memory system according to a first embodiment. The memory system 1 is connected to the host 2 via a predetermined communication interface, e.g., an interface conforming to the serial attached SCSI (SAS) standard, the serial ATA (SATA) standard, or the NVM Express (NVMe®) standard. The host 2 corresponds to, for example, a personal computer, a portable information terminal, or a server. The memory system 1 may receive an access request (e.g., a read request and a write request) from the host 2. Each access request includes a logical address indicating an access destination. The logical address indicates a location in a logical address space provided to the host 2 by the memory system 1. The memory system 1 receives writing target data along with the write request.

The memory system 1 includes a memory controller 10 and a NAND flash memory (NAND memory) 20. The memory controller 10 is a circuit that executes data transmission between the host 2 and the NAND memory 20. The memory system 1 may include other types of nonvolatile memory instead of the NAND memory 20. For example, the memory system 1 may include a NOR flash memory instead of the NAND memory 20.

The NAND memory 20 includes one or more memory chips 21. Here, for example, the NAND memory 20 includes four memory chips 21. Each memory chip 21 includes a plurality of blocks (e.g., blocks 22). The block 22 is, for example, a minimum unit of data erasure. The block 22 includes a plurality of pages. The page is, for example, a minimum unit of data reading or data writing.

A plurality of blocks 22 may form one logical block. For example, one logical block comprises the plurality of blocks 22 belonging to different memory chips 21, and data stored in the plurality of blocks 22 which form the logical block is erased collectively.

A plurality of pages may form one logical page. For example, one logical page comprises pages with a same page number (i.e., page index), each of which is selected from different block 22 of the plurality of blocks 22 which form the one logical block. In one logical page, reading of data or writing of data may be executed in parallel.

Even when the blocks 22 are replaced with a logical block and the pages are replaced with a logical page, a technology to be described below may be applied.

The memory controller 10 includes a central processing unit (CPU) 11, a host interface (I/F) 12, a random access memory (RAM) 13, and a NAND Controller (NANDC) 14.

The CPU 11 executes control operations of the memory controller 10 based on firmware. The firmware is stored in advance in, for example, a nonvolatile memory such as a NAND memory 20, is read from the NAND memory 20 at the time of start up of the memory system 1, and is executed by the CPU 11.

The RAM 13 is a memory that provides a temporary storage region. Other types of memory may be used. The RAM 13 may be a dynamic random access memory (DRAM), a static random access memory (SRAM), or a combination thereof. The details of various data stored in the RAM 13 will be described below.

The host interface 12 provides a communication interface with the host 2. The host interface 12 executes data transmission between the host 2 and the RAM 13 under the control of the CPU 11. The NANDC 14 executes data transmission between the NAND memory 20 and the RAM 13 under the control of the CPU 11. That is, data transmission between the host 2 and the NAND memory 20 is executed via the RAM 13 under the control of the CPU 11. Data transmitted from the host 2 is referred to as user data (for example, user data 23 illustrated in FIG. 6).

When the user data 23 is to be written to the NAND memory 20, the CPU 11 determines a physical location of a writing destination of the user data 23 from free regions. The physical location is expressed by a physical address. The free region is a region in which valid data is not stored yet and new data may be written. The CPU 11 maps a logical address indicating the location of the user data 23 to a physical location of a determined writing destination.

In a case where the logical address designated for storing the user data 23 (new user data 23) had been mapped to a physical location storing another user data 23 (e.g., old user data 23), the physical location storing the old user data 23 becomes a state in which the physical location is no longer mapped from the logical address as a result of updating of the mapping. As a result, the host 2 can read the new user data 23 from the memory system 1, but cannot read the old user data 23. User data 23 stored in a physical location mapped from a logical address is referred to as valid data. User data 23 stored at a physical location not mapped from a logical address is referred to as invalid data.

The CPU 11 performs a relocating process in addition to the data transmission between the host 2 and the NAND memory 20. The relocating process is a process of moving at least valid data between the blocks 22 in the NAND memory 20.

An example of the relocating process executed by the CPU 11 is garbage collection. As a result of consumption of free regions, the blocks 22 with free regions may be exhausted. The CPU 11 erases blocks, that is, generates the blocks 22 with free regions by erasing invalid data contained in the blocks. Since it is rare that all the data stored in one block 22 become invalid as a result of writing from the host 2 only, the CPU 11 copies valid data remaining in a certain block 22 to another block 22. Mapping is updated along with the copy of the valid data. As a result, the copy source block 22 becomes the block 22 that does not contain any valid data. The block 22 that does not contain the valid data is referred to as a free block. A process of relocating data to increase the number of free blocks is referred to as garbage collection. Subsequently, the CPU erases all the invalid data stored in the free block 22 to create an erased block, which may be provided as a new writing destination.

The CPU 11 executes wear leveling as another relocating process. The wear leveling is a process of copying data between the blocks 22 to equalize the erase counts (i.e. the numbers of program/erase cycles) of each block 22 across the plurality of blocks 22. When a difference in the erase counts increases among the plurality of blocks 22 included in the NAND memory 20, the CPU 11 preferentially selects the block 22 in which the erase count is small as a relocating source. In the wear leveling, a relocating source may be selected based on an elapsed time after erasing, instead of an erase count. For example, when there is a large difference in an elapsed time after execution of erasing among the blocks 22, the block 22 in which the elapsed time is longer than the other blocks may be selected as a relocating source.

In the wear leveling, not only valid data but also invalid data may also be copied. However, only valid data is assumed to be copied in the wear leveling in the following description.

Next, an influence of the relocating process on performance of the memory system 1 will be described. Writing the user data 23 to the NAND memory 20 in the relocating process is referred to as relocating writing. Writing the user data 23 received from the host 2 initially to the NAND memory 20 is referred to as host writing.

Figure 2A:
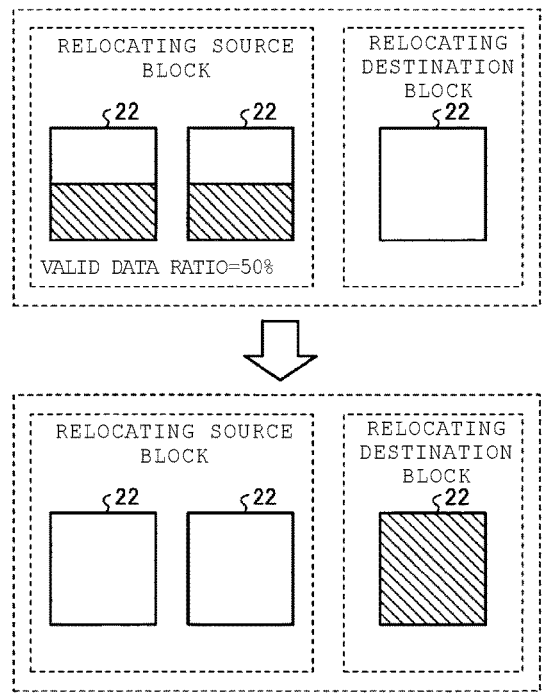
FIGS. 2A and 2B are diagrams illustrating a ratio of a host writing amount to a relocating writing amount.
Figure 2B:
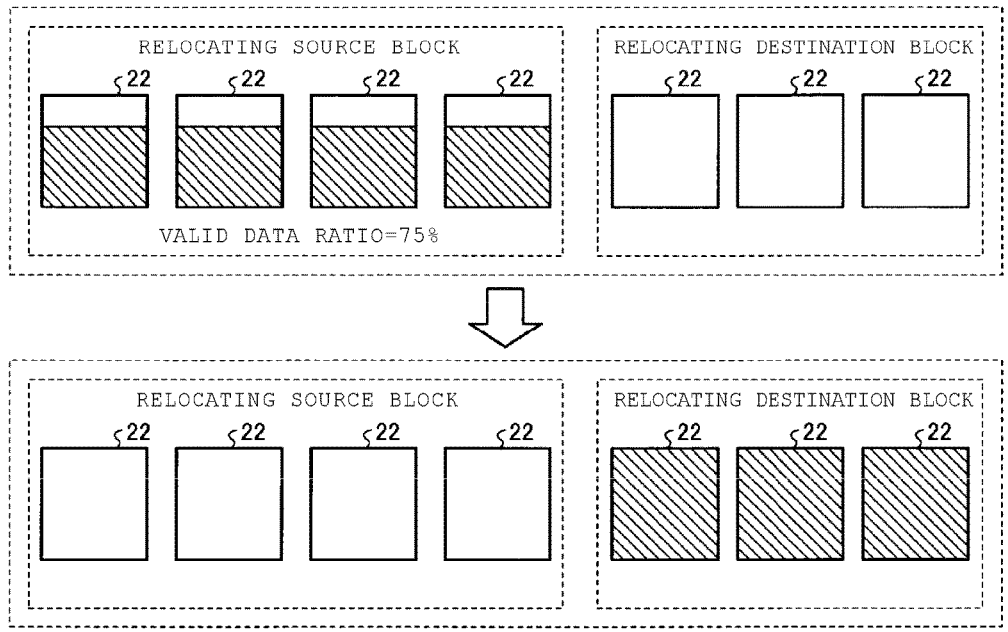

FIGS. 2A and 2B are diagrams illustrating a ratio of a host writing amount to a relocating writing amount. The host writing amount means an amount of user data 23 written to the NAND memory 20 through the host writing. The relocating writing amount is an amount of user data 23 written to the NAND memory 20 through the relocating writing. In FIGS. 2A and 2B, the area of a hatched portion corresponds to an amount of valid data. FIG. 2A illustrates a relocating process when the block 22 with a valid data ratio of 50% is a relocating source. FIG. 2B illustrates a relocating process when the block 22 with a valid data ratio of 75% is a relocating source. The valid data ratio is a ratio of the amount of valid data stored in the block 22 to a total amount of user data 23 which can be stored in the block 22.

When data as much as a size of one block 22 received from the host 2 is written to the NAND memory 20, one free block is consumed by the host writing. In order to maintain the same number of free blocks, it is necessary to generate one free block.

As illustrated in FIG. 2A, when the block 22 with the valid data ratio of 50% is a relocating source, two relocating sources are necessary in order to increase the number of free blocks by 1 by garbage collection. Here, a sum of relocating writing amounts is an amount of data of one block 22. Accordingly, a ratio between a host writing amount and a relocating writing amount is 1:1.

On the other hand, as illustrated in FIG. 2B, when the block 22 with the valid data ratio of 75% is a relocating source, four relocating source blocks are necessary in order to increase the number of free blocks by 1 the garbage collection. Here, a sum of relocating writing amounts is an amount of data of three blocks 22. Accordingly, a ratio between a host writing amount and a relocating writing amount is 1:3.

In this way, as the valid data ratio of the transmission source block 22 is smaller, the ratio of the relocating writing amount to the host writing amount can be smaller. Accordingly, as the valid data ratio of the relocating source block 22 is smaller, degradation in performance due to the relocating process is small. Accordingly, in the garbage collection, the CPU 11 preferentially selects the block 22 in which the valid data ratio is small as a relocating source.

A rewriting frequency of each piece of data transmitted from the host 2 to the memory system 1 may not be uniform for each piece of data in some cases. In other words, periods of being updated may be different depending on logical addresses. A state of the user data 23 which tends to be invalid for a short time due to rewriting is referred to as being "hot" and a state of the user data 23 which tends to have a long valid period since the data is not rewritten for a long time is referred to as being "cold".

Figure 3A:
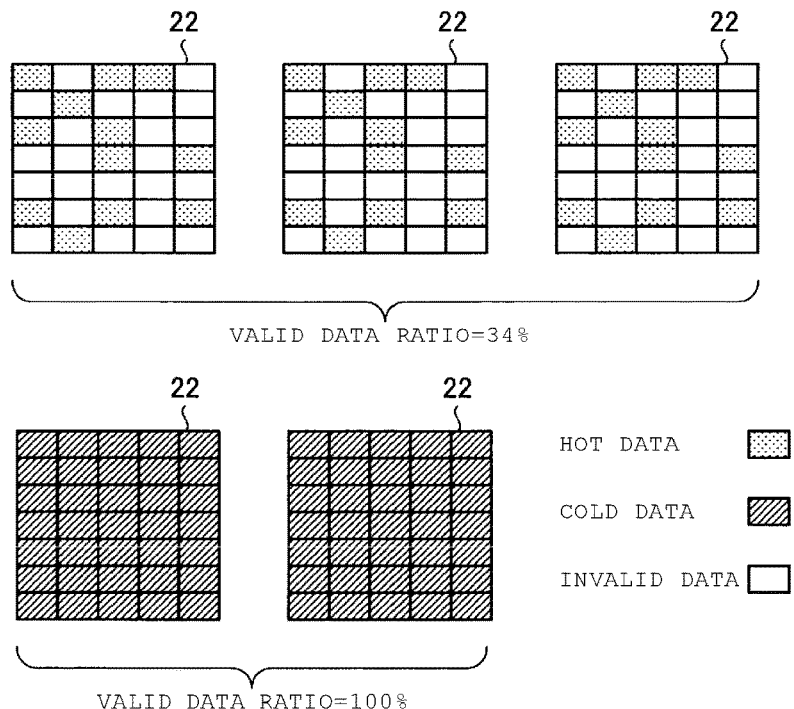
FIGS. 3A and 3B are diagrams illustrating valid data ratios.
Figure 3B:
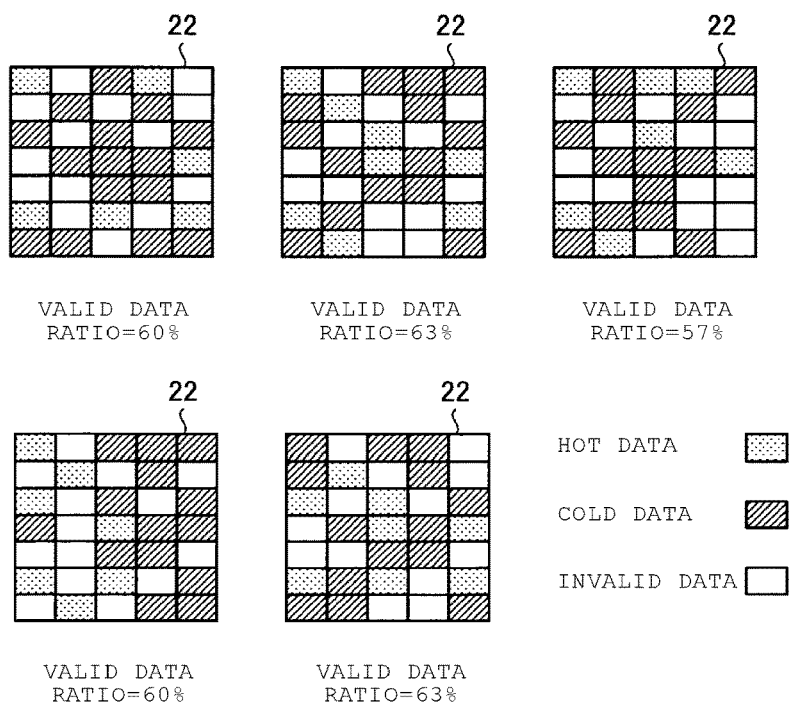

FIGS. 3A and 3B are diagrams illustrating valid data ratios. Specifically, FIG. 3A illustrates valid data ratios when hot data and cold data are separately stored in different blocks 22. FIG. 3B illustrates valid data ratios when hot data and cold data are stored being mixed in the same block 22. FIGS. 3A and 3B each illustrate states in which the hot data of the amount of three blocks 22 and the cold data of the amount of two blocks 22 are written and subsequently the same amount (approximately 66%) of hot data become invalid.

In the case of the example illustrated in FIG. 3A, the valid data ratio of each of the three blocks 22 in which the hot data is stored is 34% and the valid data ratio of each of the two blocks 22 in which the cold data is stored is 100%. On the other hand, in the case of the example illustrated in FIG. 3B, the valid data ratio of each of the five blocks 22 is in the range of 57 to 63%.

When the hot data and the cold data are stored separately in the different blocks 22 in this way, a block 22 with a smaller valid data ratio is generated, compared to when the hot data and the cold data are stored being mixed in the same block 22. As a result, a block 22 with a smaller valid data ratio can be selected as the relocating source block 22. Therefore, the degradation in the performance due to the relocating process can be smaller.

In the first embodiment, the memory controller 10 stores the hot data and the cold data separately in the different blocks 22. In the relocating process, the CPU 11 relocates the hot data and the cold data to the blocks 22 different from each other.

Any method that can distinguish the hot data from the cold data may be used. Hereinafter, a method of distinguishing the hot data from the cold data according to the first embodiment will be described.

In the block 22 storing a lot of hot data (hereinafter referred to as a hot block 22), a decrease speed of the valid data ratio is faster than in the block 22 storing a lot of cold data (hereinafter referred to as a cold block 22). Accordingly, it is easier to select the hot block 22 as a relocating source of the garbage collection than the cold block 22.

In contrast, it is more difficult to select the cold block 22 as a relocating source of the garbage collection than the hot block 22. As a result, the cold block 22 tends to have a smaller erase count than the other blocks 22. Accordingly, it is easier to select the cold block 22 as a relocating source of the wear leveling than the hot block 22.

Figure 4:
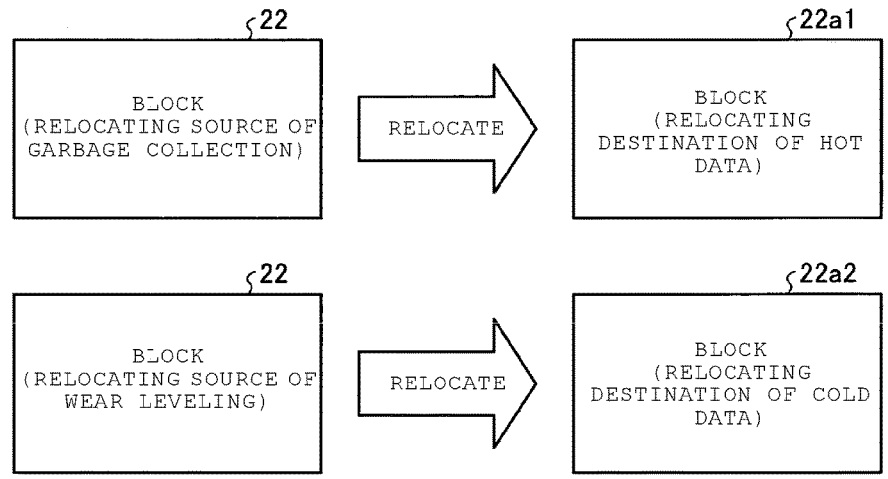
FIG. 4 is a diagram illustrating an example of a relocating process according to the first embodiment.

Based on the foregoing natures, in the first embodiment, the CPU 11 regards the block 22 selected as a relocating source of the garbage collection as the hot block 22 and regards the user data 23 stored in the hot block 22 as the hot data. Similarly, the CPU 11 regards the block 22 selected as a relocating source of the wear leveling as the cold block 22, and regards the user data 23 stored in the cold block 22 as the cold data. That is, as exemplified in FIG. 4, the CPU 11 relocates the valid user data 23 stored in the block 22 selected as the relocating source of the garbage collection to a block 22a1 prepared as a relocating destination of the hot data, and relocates the valid user data 23 stored in the block 22 selected as the relocating source of the wear leveling to a block 22a2 prepared as the relocating destination of the cold data.

Figure 5:
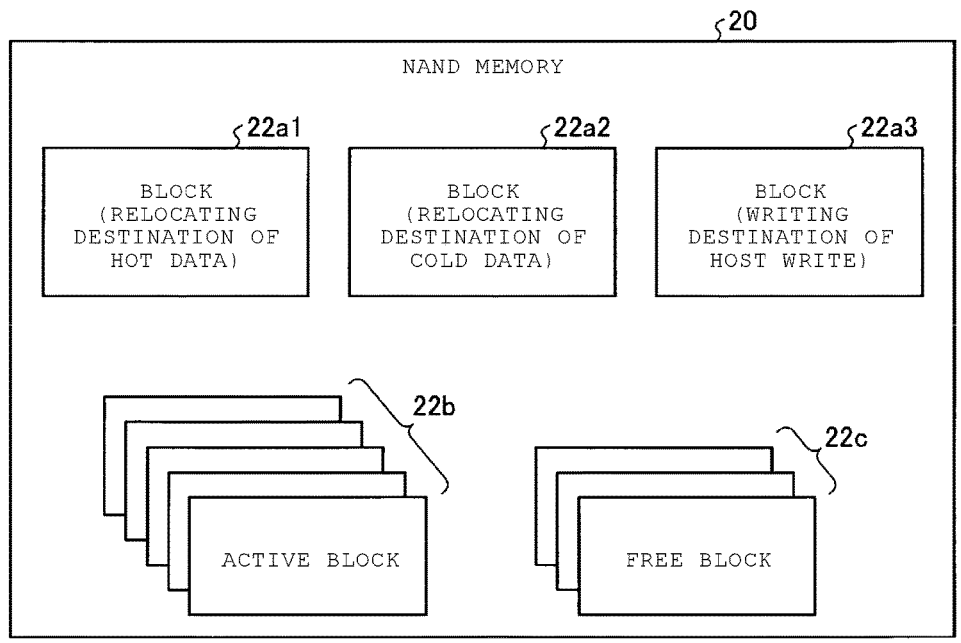
FIG. 5 is a diagram illustrating an example of a block configuration according to the first embodiment.

FIG. 5 is a diagram illustrating an example of a block configuration according to the first embodiment. As exemplified in this drawing, one block 22a1 of a relocating destination of the hot data, one block 22a2 of a relocating destination of the cold data, and one block 22a3 of a writing destination by host writing are allocated. The block 22a1 of the relocating destination of the hot data, the block 22a2 of the relocating destination of the cold data, and the block 22a3 of the writing destination by host writing are collectively referred to as input blocks 22a. The NAND memory 20 includes active blocks 22b and free blocks 22c. The active block 22b is a block 22 in a state in which data has been written up to its full capacity (i.e., the block is completely full with data). Some of active blocks 22b may not be full with valid data. The block 22 of the relocating source block is selected from such active blocks 22b. When one of the input blocks 22a has been written up to full with data, the input block 22a is subsequently handled as the active block 22b. Then, a new input block 22a is selected from the free blocks 22c.

In this way, in the embodiment, both the relocating destination of the hot data and the relocating destination of the cold data are simultaneously provided as different blocks.

There is a tendency for the valid data ratio of the cold block 22 to be greater than that the hot block 22 selected as the relocating source of the garbage collection. Accordingly, in the relocating process, a ratio of a total relocating writing amount to a host writing amount increases as a ratio of a writing rate of the cold data to a writing rate of the hot data increases. As a result, the performance of the memory system 1 degrades. When the ratio of the writing rate of the cold data to the writing rate of the hot data is changed, the ratio of the total relocating writing amount to the host writing amount is changed. Therefore, the performance of the memory system 1 is changed. A ratio between writing rates is not defined with respect to time, but an execution frequency (i.e., the number of times executed) of writing of a unit amount of data. The unit amount is, for example, a size smaller than a block, such as a page size.

In the first embodiment, in order to maintain the performance of the memory system 1 to be equal to or greater than target performance, the CPU 11 controls the relocating process so that a ratio of the writing rate of the cold data to the writing rate of the hot data becomes a predetermined ratio (either of a predetermined number of fraction, a combination of terms, or any expressions corresponding to the predetermined ratio).

In the first embodiment, in order to reduce the change in the performance of the memory system 1, the CPU 11 switches the writing on the block 22$a$1 and writing on the block 22$a$2 in units of a smaller size than the block 22, rather than in the units of blocks. Here, an example in which the CPU 11 switches each writing in units of pages will be described. However, the units of the switching are not limited thereto.

Figure 6:
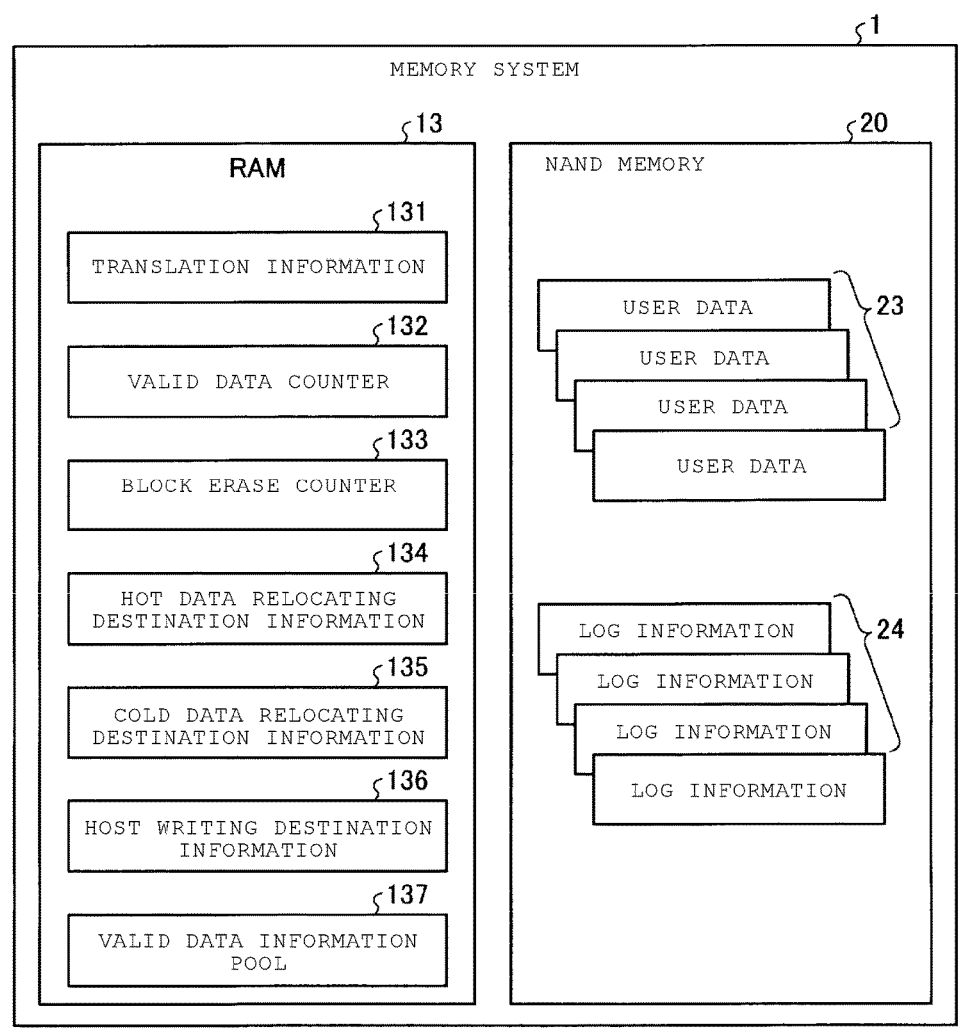
FIG. 6 is a diagram illustrating a memory configuration example of a memory system according to the first embodiment.

FIG. 6 is a diagram illustrating a memory configuration example of a memory system 1 according to the first embodiment. As illustrated, one or more pieces of user data 23 and one or more pieces of log information 24 may be stored in the NAND memory 20. Each piece of user data 23 is data which is transmitted from the host 2. The log information 24 is information in which at least a logical address of the user data 23 is recorded at a time point at which the user data 23 is transmitted from the host 2.

Figure 7:
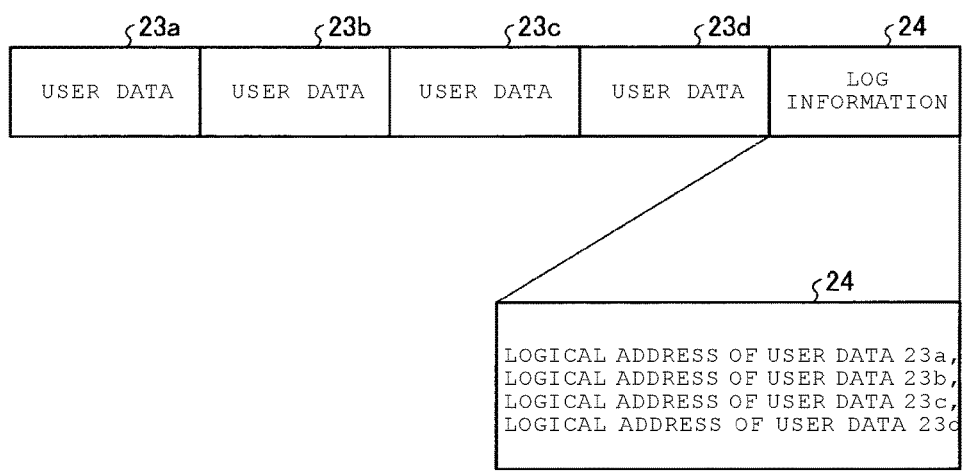
FIG. 7 is a diagram illustrating a data structure example of log information according to the first embodiment.

FIG. 7 is a diagram illustrating a data structure example of log information. In this drawing, four pieces of user data 23$a$ to 23$d$ and log information 24 are written on one page. Each of the four pieces of user data 23$a$ to 23$d$ and the log information 24 have a predetermined unit size, which is smaller than a page size. The unit size is, for example, a size referred to as a cluster. The log information 24 is an array in which the logical addresses of the four pieces of user data 23$a$ to 23$d$ are recorded. A sequence of the four logical addresses recorded in the log information 24 corresponds to a sequence of physical addresses of the four pieces of user data 23$a$ to 23$d$. Accordingly, by retrieving the log information 24, it is possible to obtain logical addresses designated by the host 2 when the four pieces of user data 23$a$ to 23$d$ stored in the same pages have been transmitted from the host 2.

The foregoing data structure of the log information 24 is merely an example. Any other data structure of the log information 24 may be used as long as the logical address designated when each piece of user data 23 has been transmitted from the host 2 can be identified.

Referring back to FIG. 6, the RAM 13 stores translation information 131, a valid data counter 132, an erase counter 133, hot data relocating destination information 134, cold data relocating destination information 135, and host writing destination information 136. Also, valid data information pool 137 is allocated in the RAM 13.

The translation information 131 is information indicating mapping of physical addresses from logical addresses. The CPU 11 updates the translation information 131 when the user data 23 transmitted from the host 2 is written on the NAND memory 20, and when the valid data is written on the NAND memory 20 in the relocating process.

Specifically, when the user data 23 transmitted from the host 2 is initially written on the NAND memory 20, the CPU 11 correlates a physical address indicating a writing destination of the user data 23 with a logical address of the user data 23 by updating the translation information 131. When the valid user data 23 is written on the NAND memory 20 in the relocating process, the CPU 11 correlates the physical address indicating the relocating destination of the user data 23 with the logical address of the user data 23.

The CPU 11 translates the logical address into the corresponding physical address by referring to the translation information 131 in a process for a read request received from the host 2, for example.

The valid data counter 132 is information in which an amount of valid user data 23 is recorded for each block 22. An expression format of the amount of valid user data 23 may have any configuration. For example, the amount of valid user data 23 may be expressed with the number of clusters. The CPU 11 updates the valid data counter 132 when the user data 23 transmitted from the host 2 is written on the NAND memory 20 and when the valid data is written on the NAND memory 20 in the relocating process.

The erase counter 133 is information in which the erase count is recorded for each block 22. For example, when erasing is executed on a certain block 22, the CPU 11 increments the erase count of the certain block 22 recorded in the erase counter 133.

The hot data relocating destination information 134 is information in which a relocating destination of the hot data is recorded and indicates the block 22$a$1 of at least a relocating destination of the hot data. The cold data relocating destination information 135 is information in which a relocating destination of the cold data is recorded and indicates the block 22$a$2 of at least a relocating destination of the cold data. The host writing destination information 136 indicates the block 22$a$3 of at least a writing destination of host writing.

When the block 22$a$ of the relocating destination of the hot data has been written up to full, the CPU 11 selects one free block 22$c$, executes erasing on the selected free block 22$c$, and sets the erased free block 22$c$ as the block 22$a$1 of a new relocating destination of the hot data. Similarly, when the block 22$b$ of the relocating destination of the cold data has been written up to full, the CPU 11 selects one free block 22$c$, executes erasing on the selected free block 22$c$, and sets the erased free block 22$c$ as the block 22$a$2 of a new relocating destination of the cold data. Similarly, when the block 22$a$3 of a writing destination of host writing has been written up to full, the CPU 11 selects one free block 22$c$, executes erasing on the selected free block 22$c$, and sets the erased free block 22$c$ as the block 22$a$3 of a new writing destination of host writing.

The valid data information pool 137 is a buffer region in which valid data information (for example, valid data information 138 illustrated in FIG. 8 or the like) is pooled. In the relocating process, a process of detecting a relocating target user data 23 is executed. The relocating target user data 23 is the valid user data 23 stored in the relocating source block 22. The valid data information 138 is intermediate information indicating the detected relocating target user data 23. The details of the valid data information pool 137 will be described below.

Figure 8:
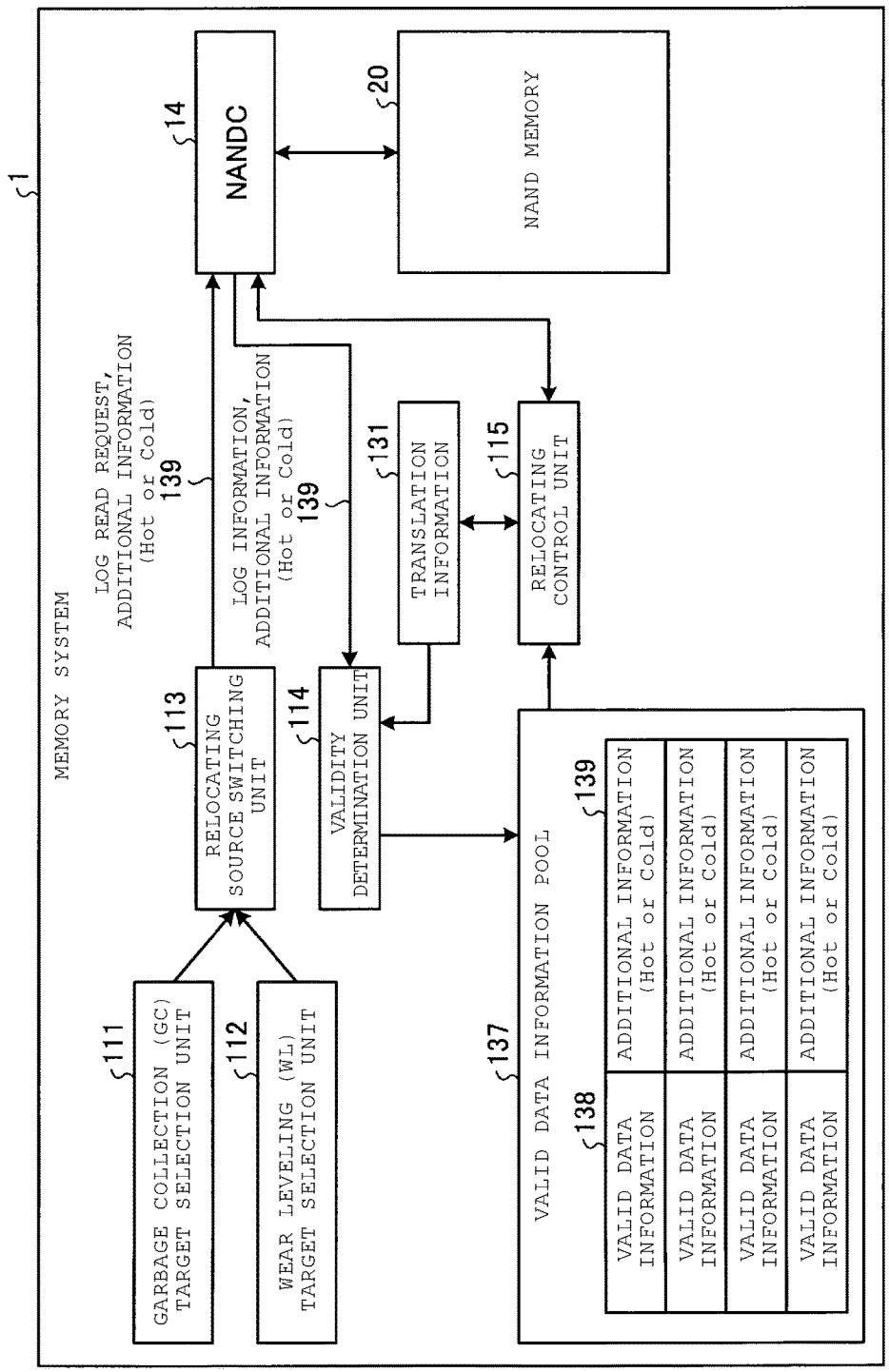
FIG. 8 is a diagram illustrating a functional configuration of the memory system according to the first embodiment.

FIG. 8 is a diagram illustrating a functional configuration of the memory system 1 according to the first embodiment. As exemplified in this drawing, the memory system 1 includes a garbage collection (GC) target selection unit 111, a wear leveling (WL) target selection unit 112, a relocating source switching unit 113, a validity determination unit 114, and a relocating control unit 115. The GC target selection unit 111, the WL target selection unit 112, the relocating source switching unit 113, the validity determination unit 114, and the relocating control unit 115 are implemented, for example, in the CPU 11. To carry out the functions of each of the GC target selection unit 111, the WL target selection unit 112, the relocating source switching unit 113, the validity determination unit 114, and the relocating control unit 115, the CPU 11 executes a corresponding firmware. The steps executed by the CPU 11 upon execution of the firmware are described below as being executed by the corresponding functional unit.

The GC target selection unit 111 selects a relocating source of the garbage collection from the plurality of blocks 22 included in the NAND memory 20. With reference to the valid data counter 132, the GC target selection unit 111 selects the relocating source of the garbage collection based on a valid data ratio of each block 22 from the active blocks 22b.

The WL target selection unit 112 selects a relocating source of the wear leveling from the plurality of blocks 22 included in the NAND memory 20. With reference to the erase counter 133, the WL target selection unit 112 selects a relocating source of the wear leveling from the active blocks 22b based on the erase counts of each block 22.

The relocating source switching unit 113 transmits a log read request which is a request to read the log information 24 from the relocating source of the garbage collection or the relocating source of the wear leveling to the NAND memory 20 via the NANDC 14.

The validity determination unit 114 detects the valid user data 23 stored in the relocating source based on the log information 24 read from the NAND memory 20 and the translation information 131. Then, the validity determination unit 114 stores the valid data information 138 indicating the detected valid user data 23 in the valid data information pool 137.

The log information 24 indicates the logical address of the user data 23 designated at the time of transmission of the user data 23 from the host 2, and is written on the same page as the user data 23. Accordingly, the validity determination unit 114 may obtain a correspondence relation between the logical address and the physical address at the time of transmission of the user data 23 from the host 2 by referring to the log information 24. On the other hand, the translation information 131 indicates a latest correspondence relation between the logical address and the physical address. When the correspondence relation obtained from the log information 24 matches the correspondence relation indicated by the translation information 131, the validity determination unit 114 determines that the user data 23 is valid (i.e., current). Conversely, when the correspondence relation obtained from the log information 24 does not match the correspondence relation indicated by the translation information 131, the validity determination unit 114 determines that the user data 23 is invalid (i.e., stale).

Any data structure of the valid data information 138 may be used. For example, the valid data information 138 includes a pair of logical address and physical address. The physical address recorded in the valid data information 138 is a physical address indicating a location at which the relocating target user data 23 is stored, and the logical address recorded in the valid data information 138 is a logical address from which the physical address is mapped.

The relocating control unit 115 reads the user data 23 indicated by the valid data information 138 stored in the valid data information pool 137 from the block 22 of the relocating source via the NANDC 14, and writes the read valid user data 23 on the block 22 of the relocating destination via the NANDC 14. The relocating control unit 115 writes the cold data on the block 22 indicated by the cold data relocating destination information 135, and writes the hot data on the block 22 indicated by the hot data relocating destination information 134.

As an example of a method for identifying whether the relocating target user data 23 is hot data or cold data, additional information 139 may be used.

Specifically, when the log information 24 is read from the relocating source of the garbage collection, the relocating source switching unit 113 adds the additional information 139 indicating "hot" to a log read request. When the log information 24 is read from the relocating source of the wear leveling, the relocating source switching unit 113 adds the additional information 139 indicating "cold" to a log read request. The NANDC 14 adds the additional information 139 having the same content as the log read request to the log information 24 read in response to the log read request. The validity determination unit 114 adds the additional information 139 having the same content as the log information 24 used to determine whether the user data 23 is valid to the valid data information 138. Thus, information indicating whether the relocating source of the user data 23 is the hot block 22 or the cold block 22 is shared among the relocating source switching unit 113, the validity determination unit 114, and the relocating control unit 115. As a result, it can be identified whether the user data 23 is the hot data or the cold data.

Any other method that can identify whether the relocating target user data 23 is the hot data or the cold data may be used. For example, a method of separating the valid data information pool 137 for the hot data from the valid data information pool 137 for the cold data may be adopted. As another example, the relocating control unit 115 translates the logical address indicated by the valid data information 138 into the physical address using the translation information 131. Then, based on whether the physical address indicates the relocating source of the garbage collection or the relocating source of the wear leveling, the relocating control unit 115 determines whether the user data 23 indicated by the valid data information 138 is the hot data or the cold data. In this way, any of various methods may be adopted as the method of identifying the relocating target user data 23 is the hot data or the cold data.

Figure 9:
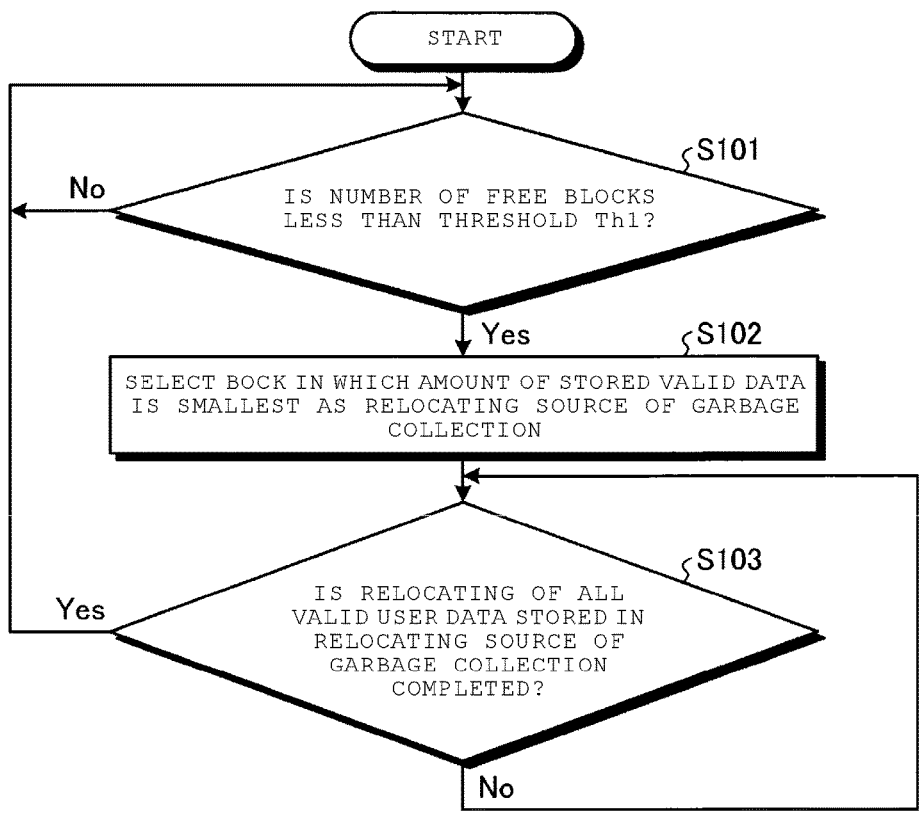
FIG. 9 is a flowchart illustrating an example of an operation of a GC target selection unit according to the first embodiment.

Next, an operation of the memory system 1 according to the first embodiment will be described. FIG. 9 is a flowchart illustrating an example of an operation of the GC target selection unit 111 included in the memory system 1 according to the first embodiment.

The GC target selection unit 111 first determines whether the number of free blocks 22c is less than a threshold Th1 (S101). When the number of free blocks 22c is not less than the threshold Th1 (No in S101), the process of S101 is executed again.

Conversely, when the number of free blocks 22c is less than the threshold Th1 (Yes in S101), the GC target selection unit 111 selects the block 22 in which the amount of stored valid data is the smallest as a relocating source of the garbage collection based on the valid data counter 132 (S102). The relocating source switching unit 113 is notified of the relocating source of the garbage collection.

The GC target selection unit 111 determines whether the relocating of all the valid user data 23 stored in the relocating source of the garbage collection is completed (S103). When the relocating is not completed (No in S103), the process of S103 is executed again. Conversely, when the relocating is completed (Yes in S103), the process of S101 is executed again.

Any other method that can select the relocating source of the garbage collection may be used. For example, the threshold Th1 may be configured with a variable value.

Selecting the block 22 in which the amount of stored valid data is the smallest as the relocating source of the garbage collection (S102) is an example of the method of selecting the relocating source of the garbage collection based on the amount of stored valid data. The GC target selection unit 111 may sample a predetermined number of blocks 22 from the NAND memory 20 and selects the block 22 in which the amount of stored valid data is the smallest among the predetermined number of sampled blocks 22. In this way, the GC target selection unit 111 preferentially selects the block 22 in which the amount of stored valid data is small as the relocating destination of the garbage collection.

Figure 10:
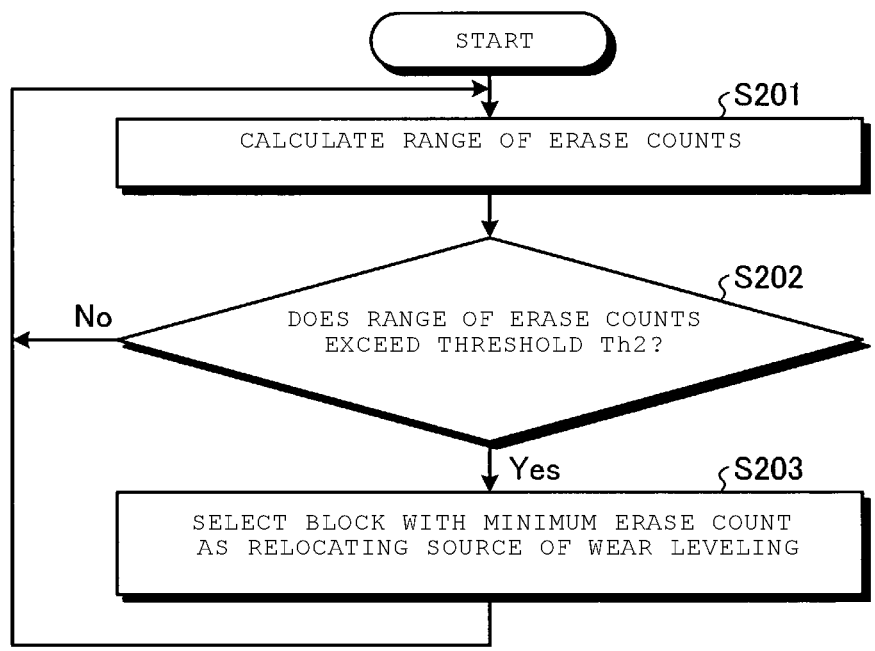
FIG. 10 is a flowchart illustrating an example of an operation of a WL target selection unit according to the first embodiment.

FIG. 10 is a flowchart illustrating an example of an operation of a WL target selection unit 112 included in the memory system 1 according to the first embodiment.

The WL target selection unit 112 first calculates the range of the erase counts in regard to the plurality of blocks 22 included in the NAND memory 20 based on the erase counter 133 (S201). The range of the erase counts is, for example, a difference between a maximum value and a minimum value of the erase counts of all the blocks 22.

The WL target selection unit 112 determines whether the range of the erase counts exceeds a threshold Th2 (S202). When the range of the erase counts does not exceed the threshold Th2 (No in S202), the process of S201 is executed again.

Conversely, when the range of the erase counts exceeds the threshold Th2 (Yes in S202), the WL target selection unit 112 selects the block 22 with the minimum erase count as the relocating source of the wear leveling (S203). The relocating source switching unit 113 is notified of the relocating source of the wear leveling. Then, the process of S201 is executed again.

In the example of the operation described above, the WL target selection unit 112 determines whether the relocating source of the wear leveling is selected based on the comparison between the range of the erase counts and the threshold Th2. The purpose of doing this is to equalize the erase counts among the plurality of blocks 22 included in the NAND memory 20. Any other method that can select the relocating source of the wear leveling may be used. For example, when there is a block 22 in which the erase count is less than an average value of the erase counts of some or all of the blocks 22 by the threshold Th2 or more, the WL target selection unit 112 selects the relocating source of the wear leveling. Conversely, when there is no block 22 in which the erase count is less than the average value by the threshold Th2 or more, the WL target selection unit 112 may stop selecting the relocating source of the wear leveling. In this way, whether to select the relocating source of the wear leveling is determined based on at least the erase counts of each block 22.

Selecting a block 22 in which the erase count is the smallest as the relocating source of the wear leveling is an example of the method of selecting a block 22 as the relocating source of the wear leveling based on the erase counts of each block 22. The WL target selection unit 112 may sample a predetermined number of blocks 22 and select the block 22 in which the erase count is the smallest among the predetermined number of sampled blocks 22. In this way, the WL target selection unit 112 preferentially selects the block 22 in which the erase count is small as the relocating source of the wear leveling based on the erase counts of each block 22.

Figure 11:
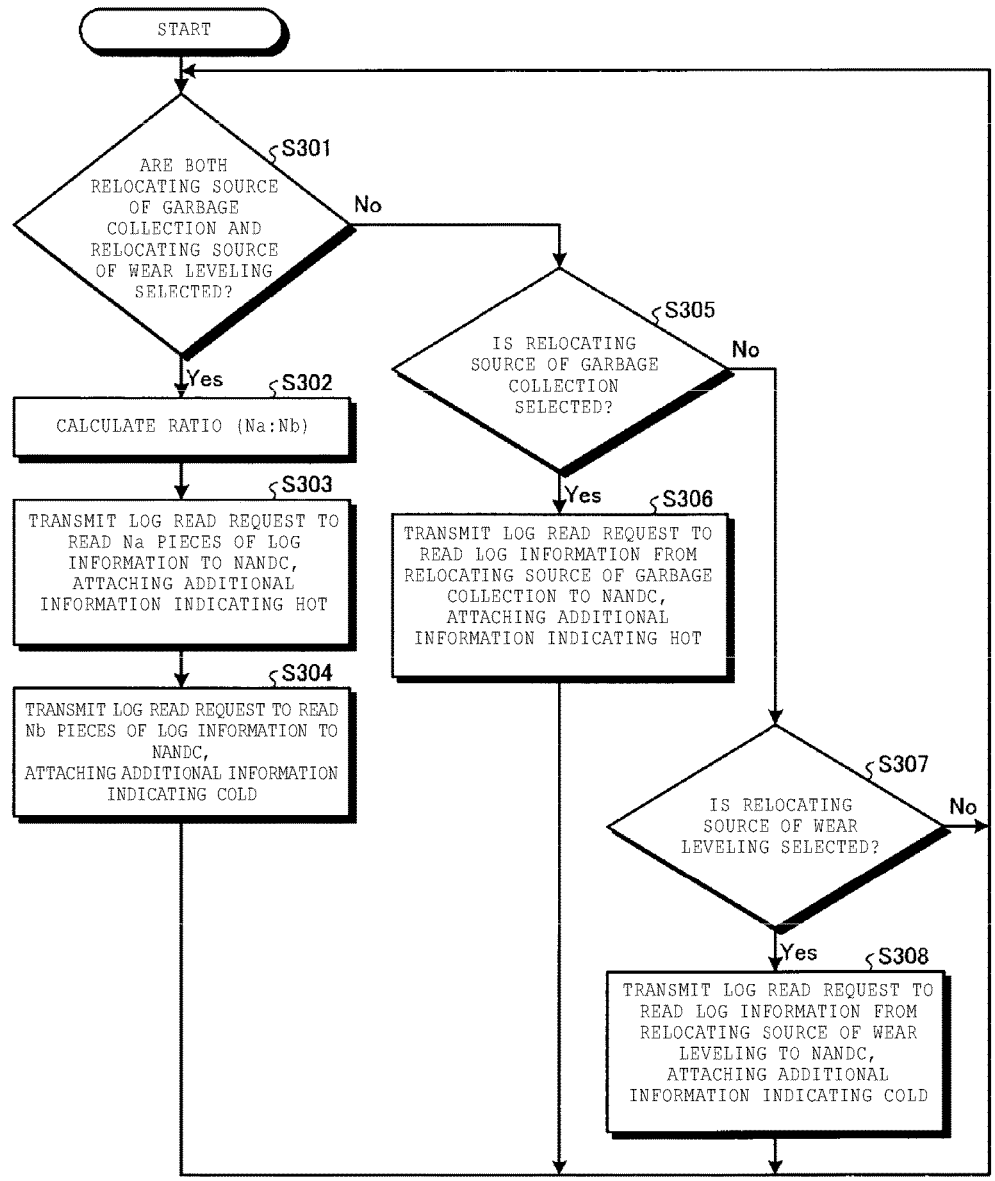
FIG. 11 is a flowchart illustrating an example of an operation of a relocating source switching unit according to the first embodiment.

FIG. 11 is a flowchart illustrating an example of an operation of the relocating source switching unit 113 included in the memory system 1 according to the first embodiment.

The relocating source switching unit 113 determines whether both the relocating source of the garbage collection and the relocating source of the wear leveling are selected (S301). The fact that both the relocating source of the garbage collection and the relocating source of the wear leveling are selected means that the valid data to be relocated remains both in the relocating source of the garbage collection and in the relocating source of the wear leveling.

When both the relocating source of the garbage collection and the relocating source of the wear leveling are selected (Yes in S301), the relocating source switching unit 113 calculates a ratio (Na:Nb) between the number of pieces (Na) of log information 24 to be read from the relocating source of the garbage collection and the number of pieces (Nb) of log information 24 to be read from the relocating source of the wear leveling based on the valid data counter 132 (S302). By the way, a number of pieces of log information 24 corresponds to a total amount of valid data and invalid data in the relocating source. Also recall that a valid data ratio is a ratio of an amount of valid data to a total amount of valid data and invalid data.

For example, when Ra is a valid data ratio of the relocating source of the garbage collection, Rb is a valid data ratio of the relocating source of the wear leveling, and Va:Vb is a target ratio between a writing rate related to a relocating process for the hot data and a writing rate related to a relocating process for the cold data, Na=Va/Ra and Nb=Vb/Rb are satisfied, because the writing rate Va (or Vb) corresponds to the valid data amount Na*Ra (or Nb*Rb). Each of Na and Nb is rounded to an integer value.

The relocating source switching unit 113 attaches the additional information 139 indicating "hot" to a log read request to read Na pieces of log information 24 from the relocating source of the garbage collection, and transmits the log read request to the NANDC 14 (S303). The relocating source switching unit 113 attaches the additional information 139 indicating "cold" to a log read request to read Nb pieces of log information 24 from the relocating source of the wear leveling, and transmits the log read request to the NANDC 14 (S304). Then, the process of S301 is executed again.

Conversely, when the relocating source switching unit 113 determines that both the relocating source of the garbage collection and the relocating source of the wear leveling are not selected in the determination process of S301 (No in S301), the relocating source switching unit 113 determines whether the relocating source of the garbage collection is selected (S305).

When the relocating source of the garbage collection is selected (Yes in S305), the relocating source switching unit 113 transmits a log read request to read the log information 24 from the relocating source of the garbage collection to the NANDC 14, attaching additional information 139 indicating "hot" (S306). Then, the process of S301 is executed again. Any number of pieces of log information 24 may be read in response to the log read request of S306.

Conversely, when the relocating source switching unit 113 determines in the determination process of S305 that the relocating source of the garbage collection is not selected (No in S305), the relocating source switching unit 113 determines whether the relocating source of the wear leveling is selected (S307).

When the relocating source of the wear leveling is selected (Yes in S307), the relocating source switching unit 113 transmits a log read request to read the log information 24 from the relocating source of the wear leveling to the NANDC 14, attaching additional information 139 indicating "cold" (S308). Then, the process of S301 is executed again. Any number of pieces of log information 24 may be read in response to the log read request of S308.

Conversely, when it is determined in the determination process of S307 that the relocating source of the wear leveling is not selected (No in S307), the process of S301 is executed again.

In this way, the relocating source switching unit 113 switches the block 22 of a reading source of the log information 24 based on whether the relocating source of the garbage collection is selected and whether the relocating source of the wear leveling is selected.

When both the relocating source of the garbage collection and the relocating source of the wear leveling are selected, the relocating source switching unit 113 controls a ratio between an amount of the log information 24 to be read from the relocating source of the garbage collection and an amount of the log information 24 to be read from the relocating source of the wear leveling so that a ratio of the writing rate of the hot data and the writing rate of the cold data in a downstream process is maintained at or within an operating margin of Va:Vb, e.g., 10% of Va:Vb.

Figure 12:
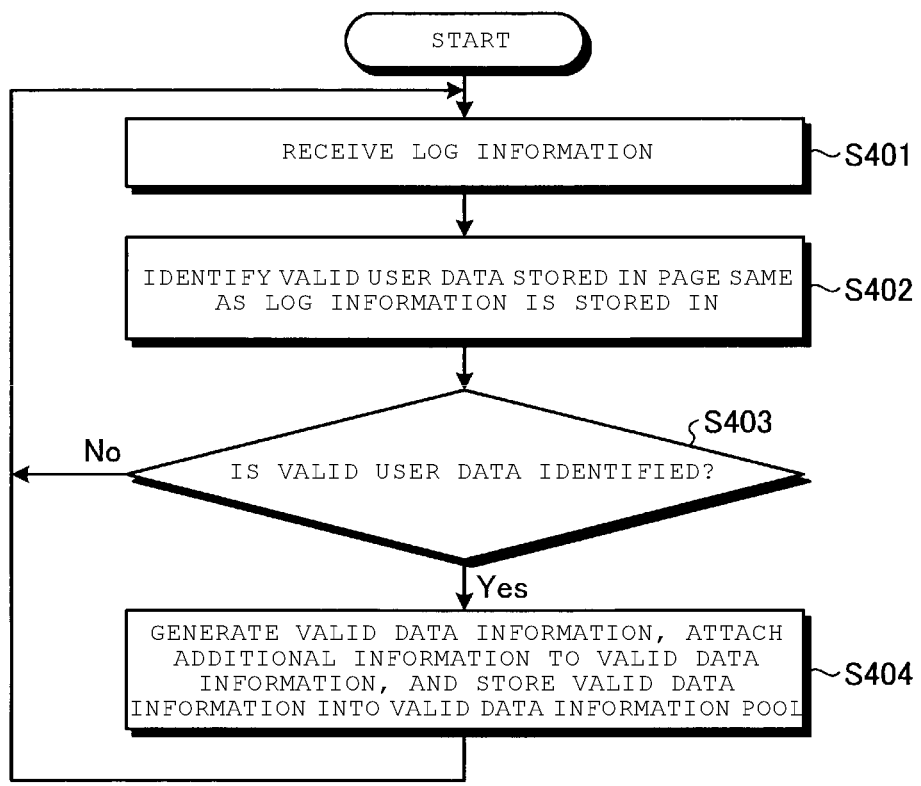
FIG. 12 is a flowchart illustrating an example of an operation of a validity determination unit according to the first embodiment.

FIG. 12 is a flowchart illustrating an example of an operation of the validity determination unit 114 included in the memory system 1 according to the first embodiment.

When the log information 24 is received via the NANDC (S401), the validity determination unit 114 detects the valid user data 23 among the plurality of pieces of user data 23 stored in the same page as the log information 24 based on the log information 24 and the translation information 131 (S402). A method of detecting the valid user data 23 has been described above.

The validity determination unit 114 determines whether valid user data 23 is detected (S403). When valid user data 23 is detected (Yes in S403), the validity determination unit 114 generates the valid data information 138 indicating the detected valid user data 23, attaches the additional information 139, which has been attached to the log information 24, to the generated valid data information 138, and stores the valid data information 138 in the valid data information pool 137 (S404). When a plurality of pieces of valid user data 23 are detected, the validity determination unit 114 generates the valid data information 138 by attaching the additional information 138 to each of the plurality of pieces of valid user data 23 in the process of S404. After the process of S404, the process of S401 is executed again.

Conversely, when the valid user data 23 is not detected (No in S403), the process of S404 is skipped and the process of S401 is executed again.

Any other method that can determine whether the user data 23 is valid may be used. For example, the CPU 11 may manage bitmap information indicating valid or invalid for each physical address of the user data 23 and detect the valid user data 23 based on the bitmap information.

Figure 13:
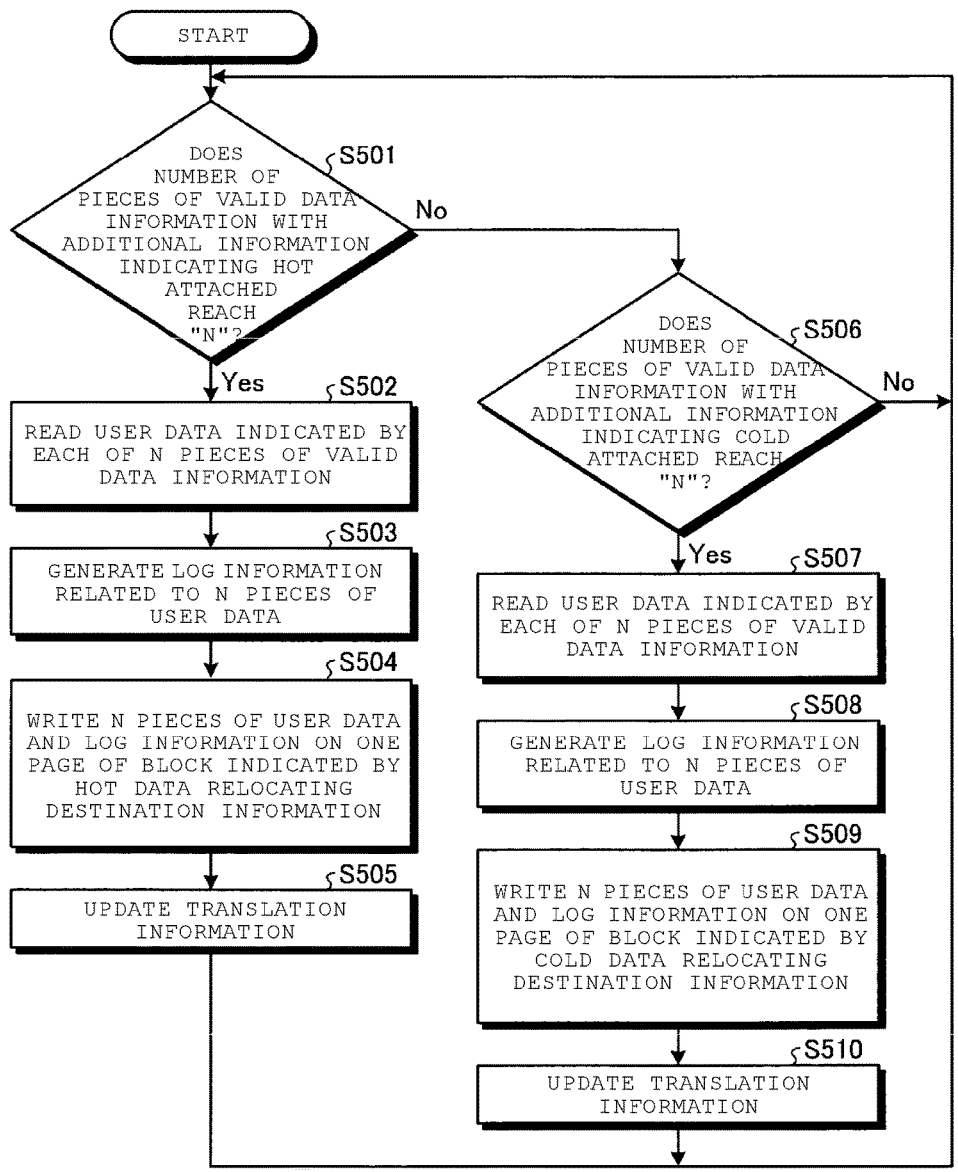
FIG. 13 is a flowchart illustrating an example of an operation of a relocating control unit according to the first embodiment.

FIG. 13 is a flowchart illustrating an example of an operation of the relocating control unit 115 included in the memory system 1 according to the first embodiment.

The relocating control unit 115 determines whether the number of pieces of valid data information 138 with the additional information 139 indicating "hot" stored in the valid data information pool 137 reaches "N" (S501). N is a maximum value of the number of pieces of user data 23 which can be stored in one page. In the example of FIG. 7, N=4 is satisfied.

When the number of pieces of valid data information 138 with the additional information 139 indicating "hot" reaches "N" (Yes in S501), the relocating control unit 115 reads the user data 23 indicated by each of the N pieces of valid data information 138 via the NANDC 14 (S502). The pieces of read user data 23 are each buffered in the RAM 13 or the like.

Subsequently, the relocating control unit 115 generates the log information 24 related to the N pieces of read user data 23 (S503). For example, the relocating control unit 115 generates the log information 24 by obtaining the logical addresses from the N pieces of valid data information 138 and arraying the N obtained logical addresses.

Subsequently, the relocating control unit 115 writes the N pieces of user data 23 read in the process of S502 and the log information 24 generated in the process of S503 on one page of the block 22 indicated by the hot data relocating destination information 134 via the NANDC 14 (S504).

Then, the relocating control unit 115 updates the translation information 131 (S505). Specifically, the relocating control unit 115 overwrites the physical address correlated with the logical address in each of the N pieces of user data 23 relocated in the processes of S502 to S504 with the physical address indicating a writing destination of the user data 23. After the process of S505, the process of S501 is executed again.

At the time of the relocating writing, the relocating control unit 115 may confirm that the logical address still remains being mapped to the physical address of the relocating source in regard to each of the N pieces of user data 23 relocated in the processes of S502 to S504, and then may update the translation information 131. The fact that the logical address at the time of the relocating is not mapped to the physical address of the relocating source means that the data having had been valid at the time of the relocating has been invalidated through subsequent host writing. When the logical address at the time of the relocating is not mapped to the physical address of the relocating source at the time of executing S505, the relocating control unit 115 does not update the correspondence relation of the logical address of the relocating.

Conversely, when the number of pieces of valid data information 138 with the additional information 139 indicating "hot" stored in the valid data information pool 137 does not reach "N" (No in S501), the relocating control unit 115 determines whether the number of pieces of valid data information 138 with the additional information 139 indicating "cold" reaches "N" (S506).

When the number of pieces of valid data information 138 with the additional information 139 indicating "cold" reaches "N" (Yes in S506), the relocating control unit 115 reads the user data 23 indicated by each of the N pieces of valid data information 138 via the NANDC 14 (S507). The pieces of read user data 23 are each buffered in the RAM 13 or the like.

Subsequently, the relocating control unit 115 generates the log information 24 related to the N pieces of read user data 23 according to the same method as that of S503 (S508). Then, the relocating control unit 115 writes the N pieces of user data 23 read in the process of S507 and the log information 24 generated in the process of S508 on one page of the block indicated by the cold data relocating destination information 135 via the NANDC 14 (S509).

Then, the relocating control unit 115 updates the translation information 131 (S510). Specifically, the relocating control unit 115 overwrites the physical address correlated with the logical address in each of the N pieces of user data 23 relocated in the processes of S507 to S509 with the physical address indicating a writing destination of the user data 23.

Conversely, when the number of pieces of valid data information 138 with the additional information 139 indicating "cold" stored in the valid data information pool 137 does not reach "N" (No in S506) or after the process of S510, the process of S501 is executed again.

Instead of executing the relocating of the detected valid data after the amount of detected valid data reaches an amount (N) of one page, the relocating control unit 115 may relocate the user data 23 of one page when one of the hot data and the cold data is accumulated by an amount of one page in the RAM 13. Here, when the control unit 115 stores the valid data information 138 in the valid data information pool 137, the hot user data 23 and the cold user data 23 are separately stored to the RAM 13.

Figure 14:
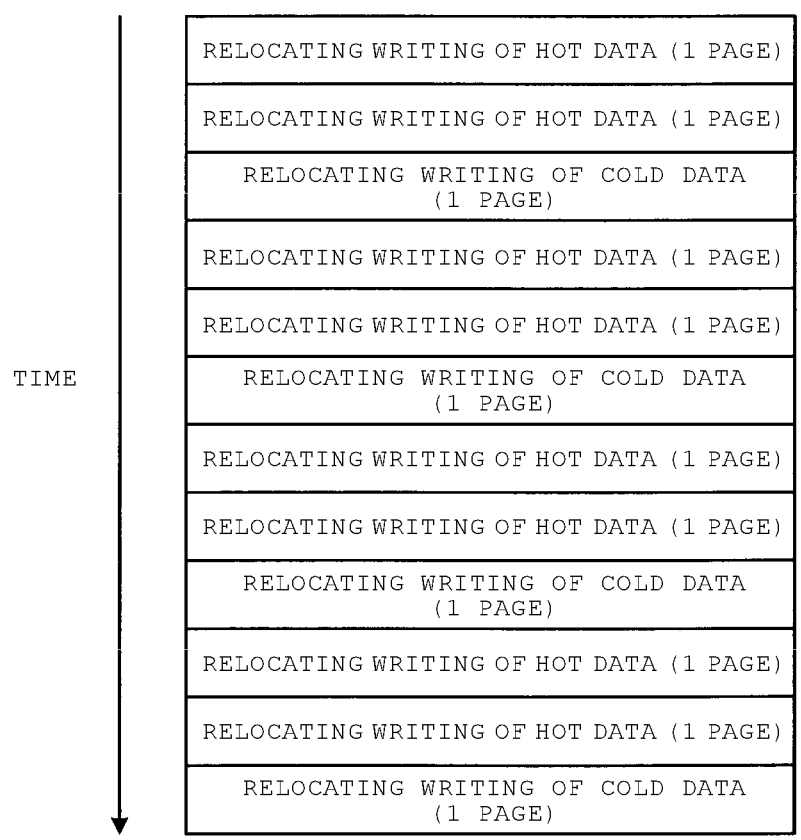
FIG. 14 is a diagram illustrating an order of writing into a NAND memory according to the first embodiment.

FIG. 14 is a diagram illustrating an order of writing into a NAND memory 20 achieved through the above-described operation according to the first embodiment. This drawing illustrates an order of writing data when Va:Vb is set to 2:1. As illustrated, writing the hot data of two pages and writing the cold data of one page are alternately executed. That is, the relocating process for the hot data and the relocating process for the cold data are switched in units of pages. The writing is not switched to the writing of the cold data after the writing of the hot data of two blocks, or the writing is not switched to the writing of the hot data after the writing of the cold data of one block.

As described above, according to the first embodiment, the memory controller 10 selects the relocating source of the garbage collection and selects the relocating source of the wear leveling. Then, the memory controller 10 relocates the valid data stored in the relocating source of the garbage collection to the relocating source for the hot data and relocates the valid data stored in the relocating source of the wear leveling to the relocating source for the cold data.

Thus, the user data 23 that stays in a valid state in a relatively short time and the user data 23 that stays in a valid state in a relatively long time are stored in the different blocks 22. Accordingly, it is possible to prevent the performance of the memory system 1 from degrading due to the relocating process.

In the NAND memory 20, both the block 22a1 of the relocating destination of the hot data and the block 22a2 of the relocating destination of the cold data are simultaneously allocated. Thus, it is possible to execute the relocating process for the hot data and the relocating process for the cold data concurrently.

The memory controller 10 switches the relocating process for the hot data and the relocating process for the cold data in units of data with a size smaller than the block 22. Thus, it is possible to reduce a change in the performance of the memory system 1 compared to when the switching between the relocating processes in units of data with the size of the block 22.

When the relocating source of the garbage collection and the relocating source of the wear leveling are selected together, the memory controller 10 relocates each piece of valid data so that a ratio between the writing rate of the valid data read from the relocating source of the garbage collection and the writing rate of the valid data read from the relocating source of the wear leveling is maintained at or within an operating margin of a predetermined ratio.

Accordingly, even when a valid data ratio of the relocating source of the wear leveling is large, it is possible to prevent the performance of the memory system 1 from degrading when the wear leveling is executed.

Second Embodiment

The NAND memory 20 includes a memory cell array formed by a plurality of memory cell transistors (also referred to as memory cells). At the time of writing, a threshold voltage of each memory cell is controlled such that the threshold voltage falls within a range according to data intended to be stored therein. A relation between the range of the threshold voltage and the data is defined in advance. However, the threshold voltage of the memory cell may be changed in various reasons. When the threshold voltage is changed, data may be read as different from the data programmed in the memory cell in some cases. The changed data is usually detected as an error by an error detection function of the memory system 1. Then, the detected error is corrected to the data at the time of writing by an error correction function.

However, the correction capability of the error correction function has an upper limit. In order to prevent the number of error bits from exceeding the upper limit of the correction capability, the written user data 23 is refreshed at a predetermined timing. The refresh is a process of reading the user data 23 stored in the NAND memory 20, correcting the user data 23 in the read user data 23 if there is any error therein, and writing back the corrected user data 23 into the NAND memory 20. The source block 22 and the destination block 22 may be different in the refresh process.

Figure 15:
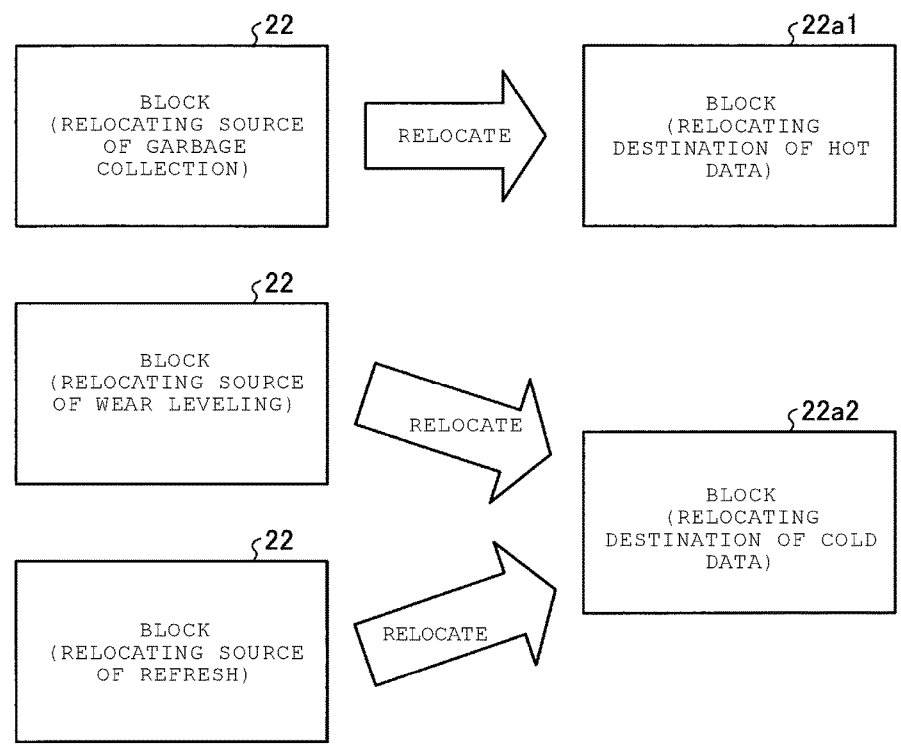
FIG. 15 is a diagram illustrating an example of a relocating process according to a second embodiment.

The block 22 in which data have not been rewritten for a long time has a tendency to be easily selected as a relocating source of the refresh. Accordingly, in the second embodiment, the CPU 11 executes refresh as a relocating process as well as the garbage collection and the wear leveling. Then, as exemplified in FIG. 15, the CPU 11 regards the block 22 selected as a relocating source of the refresh as the cold block 22 in addition to the block 22 selected as a relocating source of the wear leveling, and relocates the valid user data 23 stored in the relocating source of the refresh to the block 22 prepared as a relocating destination of the cold data.

Figure 16:
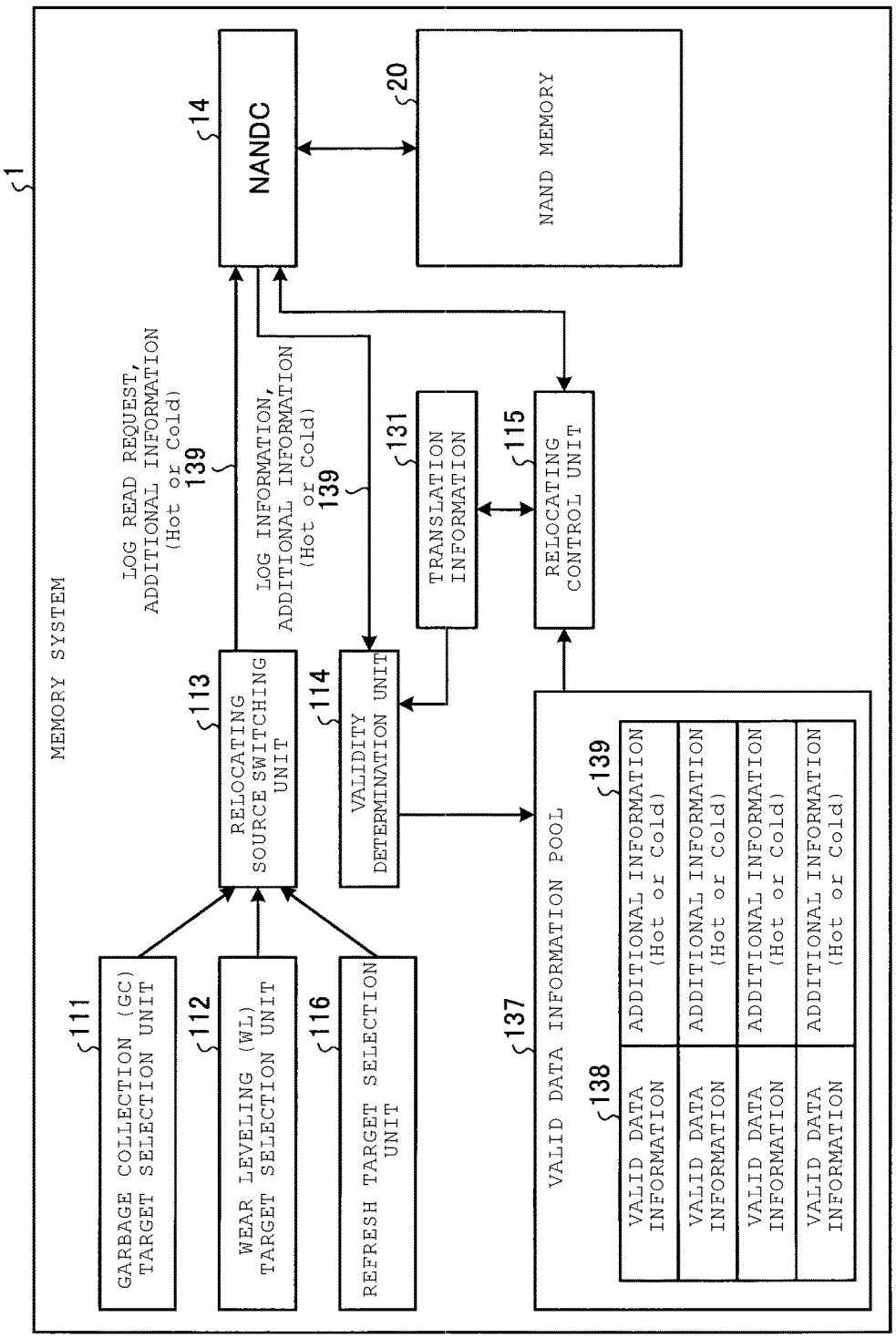
FIG. 16 is a diagram illustrating a functional configuration of a memory system according to the second embodiment.

FIG. 16 is a diagram illustrating a functional configuration of a memory system 1 according to the second embodiment. As exemplified in this drawing, a memory system 1 according to the second embodiment has a configuration in which a refresh target selection unit 116 is added to the memory system 1 according to the first embodiment. The refresh target selection unit 116 is implemented, for example, in the CPU 11. To carryout the functions of the refresh target selection unit 116, the CPU 11 executes a corresponding firmware. The steps executed by the CPU 11 upon execution of the firmware are described below as being executed by the refresh target selection unit 116. Hereinafter, only a function and an operation of the added refresh target selection unit 116 will be described. The functions and operations of the other functional configuration units are the same as those of the first embodiment, and thus the functions and the operations will not be described.

The refresh target selection unit 116 selects a relocating source of the refresh from the plurality of blocks 22 included in the NAND memory 20. Any method that can select the relocating source of the refresh may be used. Here, three selection methods will be described.

Figure 17:
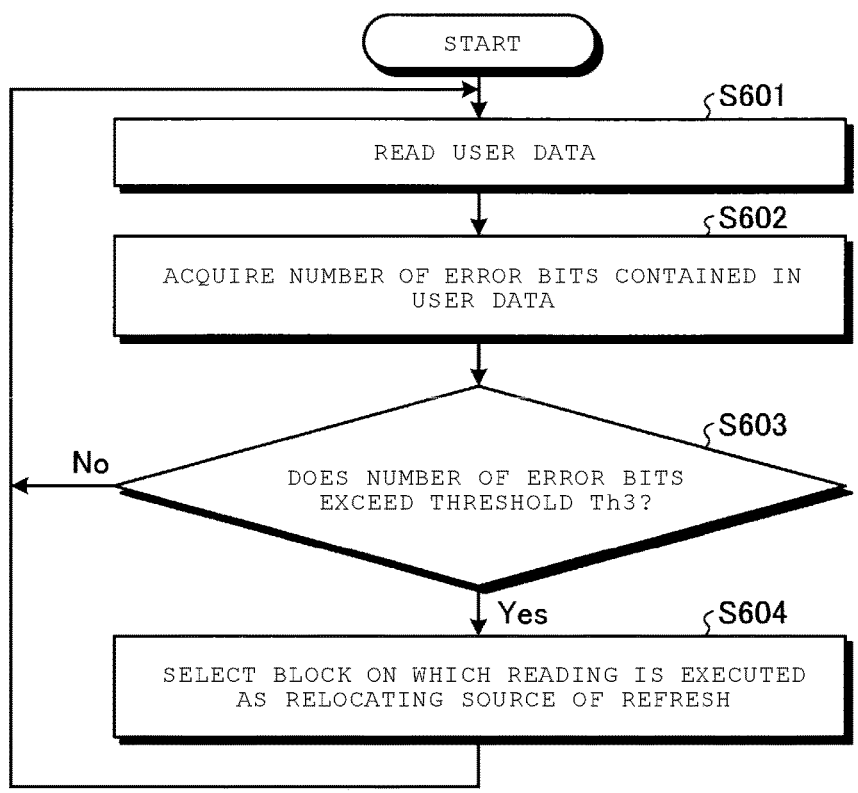
FIG. 17 is a flowchart illustrating an example of an operation of a refresh target selection unit according to the second embodiment.

FIG. 17 is a flowchart illustrating an example of an operation of the refresh target selection unit 116 according to the second embodiment.

When the user data 23 is read from the NAND memory 20 (S601), the refresh target selection unit 116 acquires the number of error bits contained in the user data 23 (S602). The number of error bits contained in the data read in the process of S601 is measured by an error correction function (not illustrated) of the memory system 1 and is acquired by the refresh target selection unit 116.

The reading process of S601 may be reading executed in response to a read request from the host 2 or may be reading executed irrespective of a read request from the host 2. For example, in order to detect a refresh target block 22, reading may be executed on each block 22 at a predetermined period irrespective of a read request from the host 2.

Subsequently, the refresh target selection unit 116 determines whether the number of error bits exceeds a threshold Th3 (S603). When the number of error bits exceeds the threshold Th3 (Yes in S603), the refresh target selection unit 116 selects the block 22 on which the reading is executed as the relocating source of the refresh (S604).

Conversely, when the number of error bits does not exceed the threshold Th3 (No in S603) or after the process of S604, the process of S601 is executed again.

In this way, in an operation example of FIG. 17, the refresh target selection unit 116 determines whether the relocating source of the refresh is selected based on whether the number of error bits of the read data exceeds the threshold Th3. Any other method that can select the relocating source of the refresh may be used. The refresh target selection unit 116 may select a block 22 as the relocating source of the refresh, when the number of times that the number of error bits exceeds the threshold Th3 exceeds a threshold Th4 in the block 22. Conversely, when there is no block 22 in which the number of times that the number of error bits exceeds the threshold Th3 exceeds the threshold Th4, the refresh target selection unit 116 may stop selecting the relocating source of the refresh. In this way, whether the relocating source of the refresh is selected may be determined based on at least the number of error bits.

When the number of error bits exceeds the threshold Th3, the refresh target selection unit 116 selects the block 22 on which the reading is executed as the relocating source of the refresh. Any other method that can select the relocating source of the refresh may be used. As described above, when there is a block 22 in which the number of times that the number of error bits exceeds the threshold Th3 exceeds the threshold Th4, the block 22 may be selected as the relocating source of the refresh. In this way, the relocating source of the refresh may be selected based on at least the number of error bits.

The memory system 1 may further have another error correction function (referred to as a second error correction function) with higher error correction capability than the above-described error correction function (hereinafter referred to as a first error correction function). When the first error correction function fails in the error correction, the memory controller 10 may execute the error correction in accordance with the second error correction function, which is stronger in the error correction capability. When the first error correction function fails in the error correction, the refresh target selection unit 116 may select the block 22 on which reading is executed as the relocating source of the refresh.

Another method may be used to select the relocating source of the refresh based on an error. In this another method, instead of the number of error bits, the number of error occurrences during reads performed on each of the different blocks 22 are tracked and the block having the largest number of error occurrences is selected as the relocating source.

Figure 18:
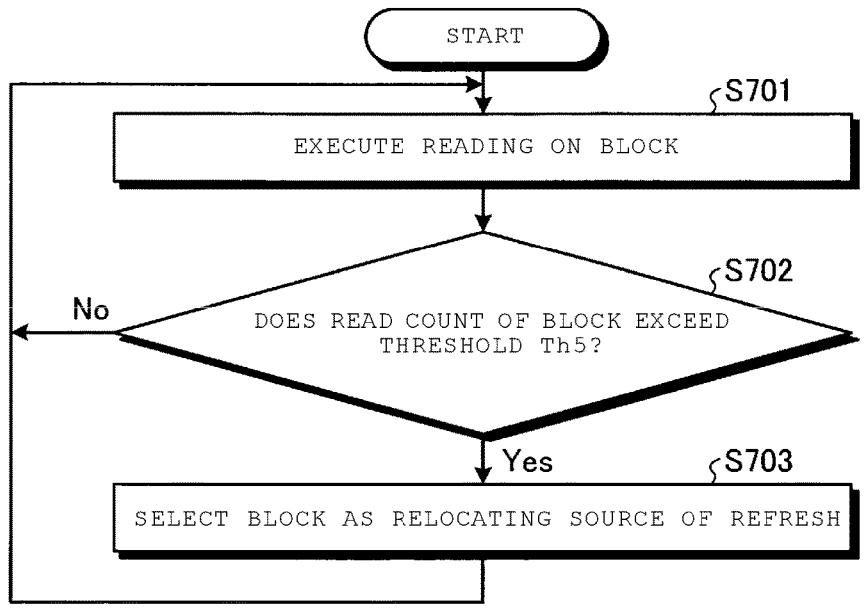
FIG. 18 is a flowchart illustrating another example of the operation of the refresh target selection unit according to the second embodiment.

FIG. 18 is a flowchart illustrating another example of the operation of the refresh target selection unit 116 according to the second embodiment. In this example, the relocating source of the refresh is selected based on the read count, i.e., the number of times that the reading is executed. This method is used to prevent the user data 23 from being unable to be corrected due to an error caused by reading disturb.

When reading the user data 23 is executed on a certain block 22 (S701), the refresh target selection unit 116 determines whether the read count on the block 22 exceeds a threshold Th5 (S702). When the read count on the block 22 exceeds the threshold Th5 (Yes in S702), the refresh target selection unit 116 selects the block 22 as the relocating source of the refresh (S703).

Conversely, when the read count on the block 22 does not exceed the threshold Th5 (No in S702) or after the process of S703, the control transitions to S701.

In this way, in the operation example of FIG. 18, the refresh target selection unit 116 determines whether the relocating source of the refresh is selected based on the read count on each block 22. When there is a block 22 for which the read count exceeds the threshold Th5, the refresh target selection unit 116 selects the block 22 as the relocating source of the refresh.

Figure 19:
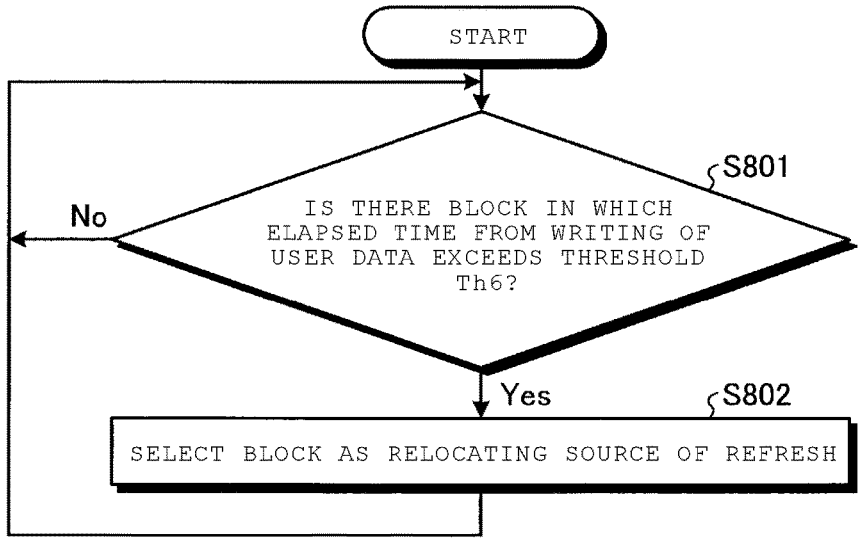
FIG. 19 is a flowchart illustrating still another example of the operation of the refresh target selection unit according to the second embodiment.

FIG. 19 is a flowchart illustrating still another example of the operation of the refresh target selection unit 116 according to the second embodiment. In this example, the relocating source of the refresh is selected according to an elapsed time after writing the user data 23 is executed. This method is used to prevent the user data 23 from being unable to be corrected due to an error caused by a lapsing of data retention period.

The refresh target selection unit 116 determines whether there is the block 22 for which the elapsed time after writing of the user data 23 exceeds a threshold Th6 (S801). When there is the block 22 for which the elapsed time after the writing of the user data 23 exceeds the threshold Th6 (Yes in S801), the refresh target selection unit 116 selects the block 22 as the relocating source of the refresh (S802). Conversely, when there is no block 22 for which the elapsed time after the writing of the user data 23 exceeds the threshold Th6 (No in S801) or after the process of S802, the control transitions to S801. The reference time point of writing may be the start of writing of the block 22, or the end of writing of the block 22.

In this way, in the operation example of FIG. 19, the refresh target selection unit 116 determines whether the relocating source of the refresh is selected based on the elapsed time after the user data 23 is written on each block 22. When there is a block 22 for which the elapsed time after the user data 23 is written exceeds the threshold Th6, the refresh target selection unit 116 selects the block 22 as the relocating source of the refresh.

As described with reference to FIGS. 17 to 19, the refresh target selection unit 116 may select the relocating source of the refresh in accordance with various methods. The refresh target selection unit 116 may simultaneously execute a plurality of methods among the methods of FIGS. 17 to 19.

In the second embodiment, as described above, the block 22 selected as the relocating source of the wear leveling and the block 22 selected as the relocating source of the refresh are regarded as the cold blocks 22. Alternatively, the CPU 11 may regard only the block 22 selected as the relocating source of the refresh as the cold block 22.

As described above, in the second embodiment, the memory controller 10 selects the relocating source of the refresh. Then, the memory controller 10 relocates the valid data stored in the relocating source of the refresh to the relocating destination for the cold data (the block 22a2). The block 22 in which data have not been rewritten for a long time has a tendency to be easily selected as a relocating source of the refresh. Thus, since the user data 23 stored in the block 22 selected as the relocating source of the refresh is relocated to the relocating destination for the cold data, the hot data and the cold data can be stored in the different blocks 22. Accordingly, it is possible to prevent the performance from degrading due to the relocating process.

Third Embodiment

Any method that can control a ratio of the writing rate of the cold data to the writing data of the hot data, other than as described in the first embodiment, may be used. In a third embodiment, another example of controlling a ratio of the writing rate of the cold data to the writing rate of the hot data will be described.

Figure 20:
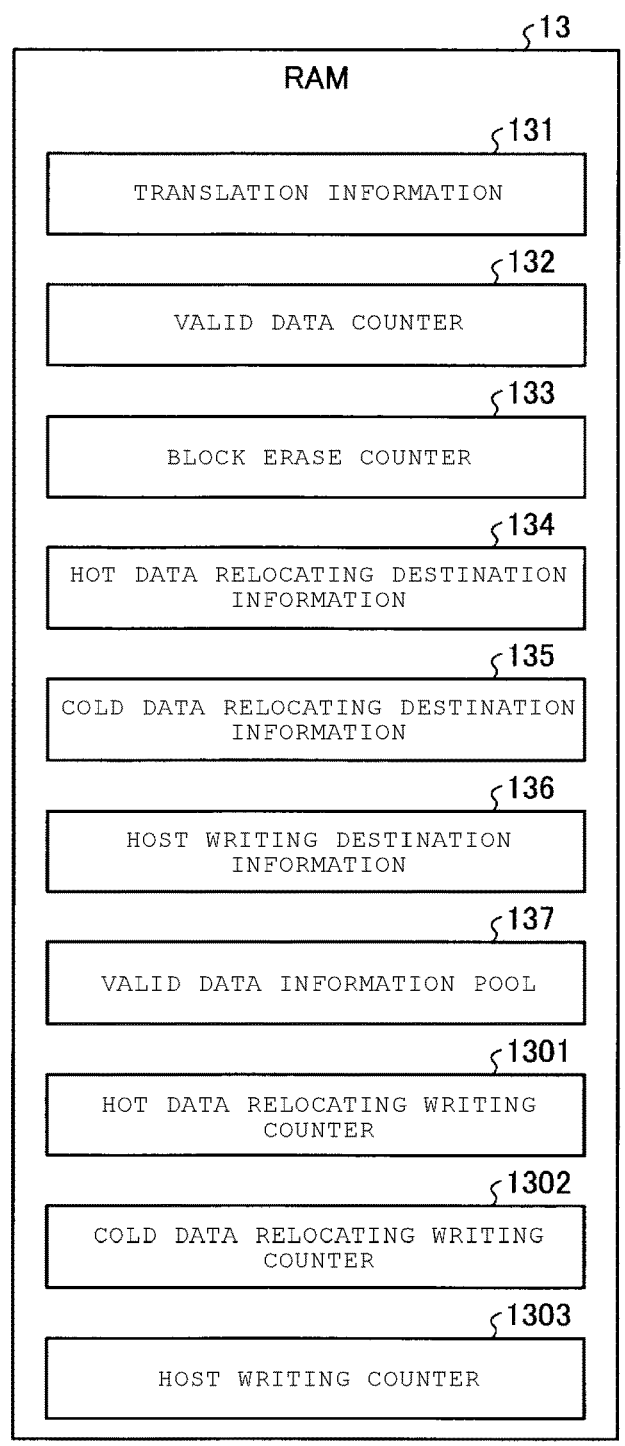
FIG. 20 is a diagram illustrating various data stored in a RAM according to a third embodiment.

FIG. 20 is a diagram illustrating various data stored in the RAM 13 according to a third embodiment. In the third embodiment, the RAM 13 stores a hot data relocating writing counter 1301, a cold data relocating writing counter 1302, and a host writing counter 1303 in addition to the various same kinds of information as those of the first embodiment.

The hot data relocating writing counter 1301 is a counter indicating a relocating writing amount of the hot data and increments when the hot data of one page has been relocated.

The cold data relocating writing counter 1302 is a counter indicating a relocating writing amount of the cold data and increments when the cold data of one page has been relocated.

The host writing counter 1303 is a counter indicating a host writing amount and increments when host writing of one page has been executed.

The hot data relocating writing counter 1301, the cold data relocating writing counter 1302, and the host writing counter 1303 may be reset or may not be reset. For example, the hot data relocating writing counter 1301, the cold data relocating writing counter 1302, and the host writing counter 1303 are simultaneously reset periodically.

Figure 21:
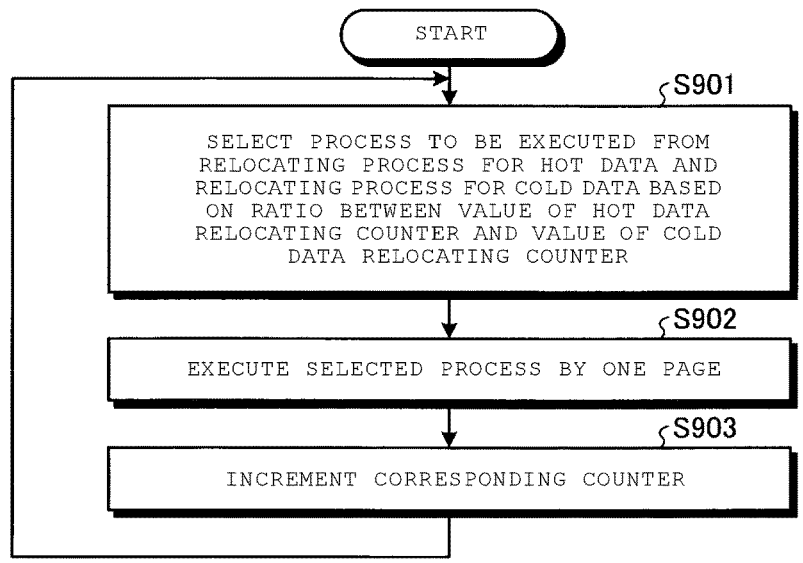
FIG. 21 is a flowchart illustrating an operation of a relocating control unit according to the third embodiment.

FIG. 21 is a flowchart illustrating an operation of a relocating control unit 115 according to the third embodiment. The relocating control unit 115 first selects a process to be executed from among the relocating process for the hot data and the relocating process for the cold data based on the hot data relocating writing counter 1301 and the cold data relocating writing counter 1302 (S901).

In S901, the relocating control unit 115 selects the process in which the value of the counter is smaller than the ratio of the target ratio. For example, the target ratio Va:Vb between the writing rate related to the relocating process for the hot data and the writing rate related to the relocating process for the cold data is assumed to be 2:1. This corresponds to the fact that the relocating writing amount of the hot data is set to a double of the relocating writing amount of the cold data, that is, the relocating writing amount of the cold data is set to half of the relocating writing amount of the hot data. When the value of the hot data relocating writing counter 1301 is "8" and the value of the cold data relocating writing counter 1302 is "5", the relocating writing amount of the hot data is less than the double of the relocating writing amount of the cold data. Therefore, the relocating control unit 115 selects the relocating process for the hot data. Alternatively, when the value of the hot data relocating writing counter 1301 is "11" and the value of the cold data relocating writing counter 1302 is "5", the relocating writing amount of the cold data is less than half of the relocating writing amount of the hot data. Therefore, the relocating control unit 115 selects the relocating process for the cold data.

When one of the valid data information 138 with the additional information 139 indicating "hot" and the valid data information 138 with the additional information 139 indicating "cold" is insufficient, the relocating control unit 115 may select the relocating process of which the valid data information 138 is sufficient in S901. The fact that the valid data information 138 is insufficient means that the number of pieces of valid data information 138 does not reach the number of pieces of user data 23 which can be stored on one page at maximum. When both the valid data information 138 with the additional information 139 indicating "hot" and the valid data information 138 with the additional information 139 indicating "cold" are sufficient, the relocating control unit 115 selects the process in which the value of the counter is smaller than the target ratio.

When both of the valid data information 138 with the additional information 139 indicating "hot" and the valid data information 138 with the additional information 139 indicating "cold" are insufficient, the relocating control unit 115 may stop the operation until any one of the amounts of the pieces of valid data information 138 becomes sufficient.

The relocating control unit 115 executes the selected process by one page (S902). For example, when the relocating control unit 115 selects the relocating process of the hot data in S901, the relocating control unit 115 executes the relocating process for the hot data of one page.

The relocating control unit 115 increments the counter corresponding to the process executed either of the hot data relocating writing counter 1301 and the cold data relocating writing counter 1302 (S903) and executes the process of S901 again.

Thus, according to the third embodiment, the control of the ratio of the writing rate of the cold data to the writing rate of the hot data is achieved. In this way, the control of the ratio of the writing rate of the cold data to the writing rate of the hot data can be achieved in accordance with any of various methods.

In accordance with the method according to the third embodiment, it is possible to control the ratio of the writing rate of the host writing, the writing rate of the cold data, and the writing rate of the hot data.

For example, the CPU 11 selects one of the host writing, the relocating process for hot data, and the relocating process for the cold data through the same process as the process of S901. Then, the CPU 11 executes the selected process by one page and increments the corresponding counter. Thus, it is possible to control the ratio of the writing rate of the host writing, the writing rate of the hot data, and the writing rate of the cold data.

Figure 22:
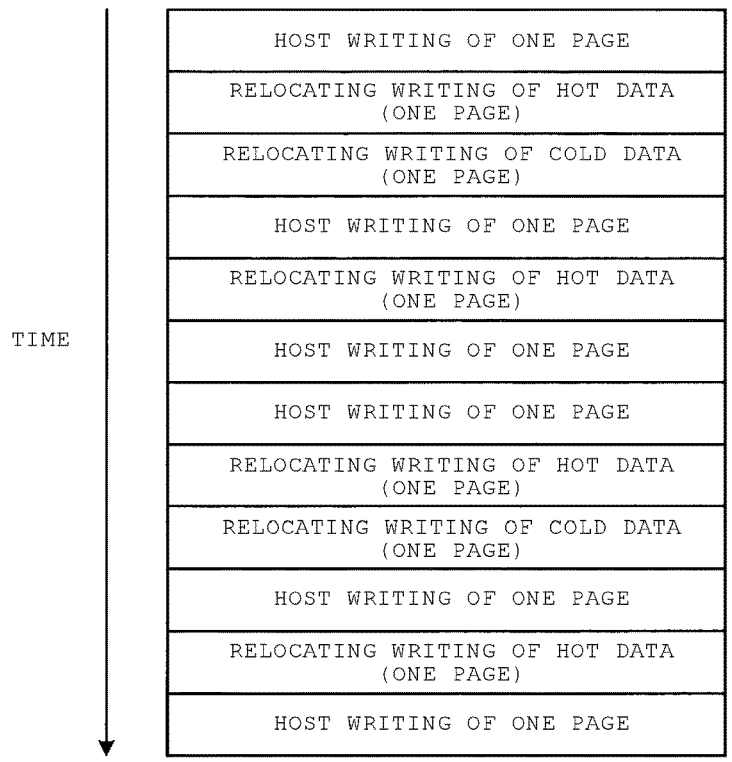
FIG. 22 is a diagram illustrating an order of writing into a NAND memory according to the third embodiment.

FIG. 22 is a diagram illustrating an order of writing into the NAND memory 20. This drawing illustrates an order of writing when the target ratio between the writing rate of the host writing and the writing rate of the relocating process of the garbage collection (i.e., the writing rate of the relocating process for the hot data) is 1.5:1, and the target ratio between the writing rate of the relocating process for the hot data and the writing rate of the relocating process for the cold data is 2:1. As illustrated, the host writing, the relocating process for the hot data, and the relocating process for the cold data are switched in units of pages. The host writing, the relocating process for the hot data, the relocating process for the cold data, the host writing, the relocating process for the hot data, and the host writing are switched in this order. As a result, it is possible to control the ratio between the writing rate of the host writing and the writing rate of the relocating process for the hot data to be maintained at or within an operating margin of 1.5:1. It is possible to control the ratio between the writing rate of the relocating process for the hot data and the writing rate of the relocating process for the cold data to be maintained at or within an operating margin of 2:1. Any other switching order may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile semiconductor memory that includes a plurality of blocks; and
a memory controller circuit configured to:
select a first block and a second block from the plurality of blocks, the first block being a garbage collection target block, the second block being a wear leveling target block or a refresh target block,
relocate first data which is valid data stored in the first block in a series of write operations to a third block including a first write operation and a second write operation, the third block being a block having a free region among the plurality of blocks, and
relocate second data which is valid data stored in the second block in a series of write operations to a fourth block including a third write operation, the fourth block having a free region and being a different block from the third block among the plurality of blocks, wherein the third write operation is performed between the first operation and the second write operation.

2. The memory system according to claim 1, wherein the memory controller circuit relocates the first data and the second data so that a ratio between a writing rate of the first data into the third block and a writing rate of the second data into the fourth block is maintained at or within an operating margin of a predetermined ratio.

3. The memory system according to claim 2, wherein the predetermined ratio is determined based on sizes of the first data and the second data.

4. The memory system according to claim 1, wherein the memory controller circuit is configured to select the first block based on an amount of valid data stored in each of the plurality of blocks.

5. The memory system according to claim 4, wherein the first block, relative to other blocks in the plurality of blocks, has the smallest amount of valid data stored therein.

6. The memory system according to claim 1, wherein the memory controller circuit is configured to select the second block based on an erase count tracked for each of the plurality of blocks.

7. The memory system according to claim 6, wherein the second block, relative to other blocks in the plurality of blocks, has the smallest erase count.

8. The memory system according to claim 1, wherein the memory controller circuit is configured to select the second block based on a read count tracked for each of the plurality of blocks.

9. The memory system according to claim 8, wherein a read count of the second block exceeds a threshold read count.

10. The memory system according to claim 1, wherein the memory controller circuit is configured to select the second block based on a number of error bits included in data read from the plurality of blocks.

11. The memory system according to claim 10, wherein a number of error bits included in data read from the second block exceeds a threshold number of error bits.

12. The memory system according to claim 1, wherein the memory controller circuit is configured to select the second block based on a number of error occurrences during data reading from the plurality of blocks.

13. The memory system according to claim 12, wherein an elapsed time from a last data writing in the second block exceeds a threshold amount of time.

14. The memory system according to claim 1, wherein the memory controller circuit is configured to select the second block based on an elapsed time from last data writing in each of the plurality of blocks.

15. The memory system according to claim 1, wherein the memory controller circuit further includes an interface circuit connectable to a host, and is further configured to write third data which is data received from the host via the interface circuit into a fifth block different from the third block and the fourth block, and execute the relocating of the first data, the relocating of the second data, and the writing of the third data so that a ratio of a writing rate of the first data into the third block, a writing rate of the second data into the fourth block, and a writing rate of the third data into the fifth block is maintained at or within an operating margin of a predetermined ratio.

16. A method of controlling a nonvolatile semiconductor memory having a plurality of blocks using a memory controller circuit, the method comprising:
selecting a first block which is garbage collection target block from the plurality of blocks;
selecting a second block which is a wear leveling target block or a refresh target block from the plurality of blocks;
relocating first data which is valid data stored in the first block in a series of write operations including a first write operation and a second write operation to a third block which is a block having a free region among the plurality of blocks; and
relocating second data which is valid data stored in the second block in a series of write operations including a third write operation to a fourth block which is a different block from the third block and has a free region among the plurality of blocks, wherein the third write operation is performed between the first write operation and the second write operation.

17. The method according to claim 16, wherein
the relocating of the first data and the relocating of the second data are carried out so that a ratio between a writing rate of the first data into the third block and a writing rate of the second data into the fourth block is maintained at or within an operating margin of a predetermined ratio.

18. The method according to claim 17, wherein the predetermined ratio is determined based on sizes of the first data and the second data.

19. The method according to claim 16, wherein
the first block is selected based on an amount of valid data stored in each of the plurality of blocks, and
the first block, relative to other blocks in the plurality of blocks, has the smallest amount of valid data stored therein.

20. The method according to claim 16, wherein
the second block is selected based on an erase count tracked for each of the plurality of blocks, and
the second block, relative to other blocks in the plurality of blocks, has the smallest erase count.

21. The method according to claim 16, further comprising:
writing third data which is data received from a host into a fifth block different from the third block and the fourth block,
wherein the relocating of the first data, the relocating of the second data, and the writing of the third data are carried out, so that a ratio of a writing rate of the first data into the third block, a writing rate of the second data into the fourth block, and a writing rate of the third data into the fifth block is maintained at or within an operating margin of a predetermined ratio.

* * * * *